United States Patent
Stark

(10) Patent No.: US 9,069,602 B2
(45) Date of Patent: *Jun. 30, 2015

(54) TRANSACTIONAL MEMORY THAT SUPPORTS PUT AND GET RING COMMANDS

(71) Applicant: Netronome Systems, Inc., Santa Clara, CA (US)

(72) Inventor: Gavin J. Stark, Cambridge (GB)

(73) Assignee: NETRONOME SYSTEMS, INCORPORATED, Santa Clara, CA (US)

( * ) Notice: Subject to any disclaimer, the term of this patent is extended or adjusted under 35 U.S.C. 154(b) by 1 day.

This patent is subject to a terminal disclaimer.

(21) Appl. No.: 14/037,214

(22) Filed: Sep. 25, 2013

(65) Prior Publication Data
US 2015/0089095 A1    Mar. 26, 2015

(51) Int. Cl.
  *G06F 9/46* (2006.01)
  *G06F 3/06* (2006.01)

(52) U.S. Cl.
  CPC ............. *G06F 9/467* (2013.01); *G06F 3/061* (2013.01); *G06F 3/0656* (2013.01); *G06F 3/0683* (2013.01)

(58) Field of Classification Search
  CPC .......... G06F 5/10; G06F 5/065; G06F 9/546; G06F 2205/064; H04L 49/90
  USPC ..................................................... 710/54, 57
  See application file for complete search history.

(56) References Cited

U.S. PATENT DOCUMENTS

| | | | | |
|---|---|---|---|---|
| 5,208,809 A | * | 5/1993 | Fergeson et al. | 370/545 |
| 5,315,707 A | * | 5/1994 | Seaman et al. | 710/56 |
| 6,097,402 A | * | 8/2000 | Case et al. | 345/543 |
| 6,112,267 A | * | 8/2000 | McCormack et al. | 710/52 |
| 8,117,395 B1 | * | 2/2012 | Rohana et al. | 711/128 |
| 2009/0271544 A1 | * | 10/2009 | Oishi | 710/53 |

* cited by examiner

*Primary Examiner* — Farley Abad
(74) *Attorney, Agent, or Firm* — Imperium Patent Works; T. Lester Wallace; Mark D. Marrello

(57) ABSTRACT

A transactional memory (TM) includes a control circuit pipeline and an associated memory unit. The memory unit stores a plurality of rings. The pipeline maintains, for each ring, a head pointer and a tail pointer. A ring operation stage of the pipeline maintains the pointers as values are put onto and are taken off the rings. A put command causes the TM to put a value into a ring, provided the ring is not full. A get command causes the TM to take a value off a ring, provided the ring is not empty. A put with low priority command causes the TM to put a value into a ring, provided the ring has at least a predetermined amount of free buffer space. A get from a set of rings command causes the TM to get a value from the highest priority non-empty ring (of a specified set of rings).

22 Claims, 20 Drawing Sheets

CLUSTER LOCAL SCRATCH ("PUT INTO RING" EXAMPLE)

WRITE OPERATION

READ OPERATION

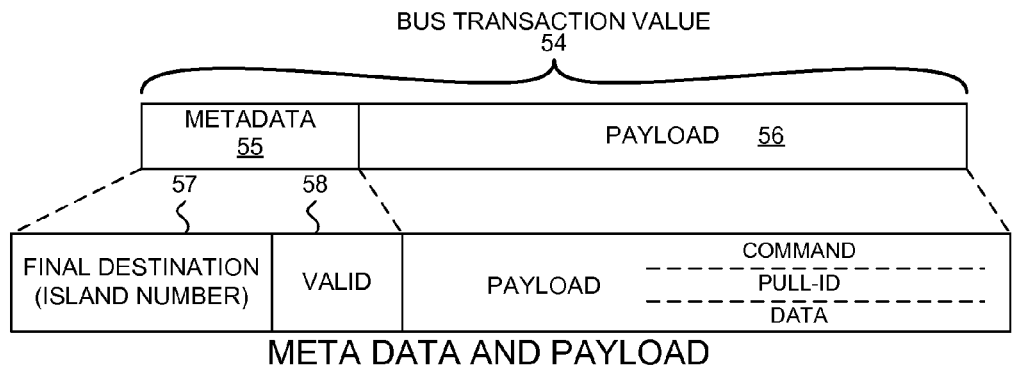

META DATA AND PAYLOAD

FIG. 4

| FIELD | WIDTH | DESCRIPTION |
|---|---|---|
| TARGET | 4 | CPP TARGET FOR THE COMMAND. |
| ACTION | 5 | ACTION RECOGNIZED BY THE CPP TARGET INDICATING WHAT SHOULD BE PERFORMED. |
| TOKEN | 2 | SUBTYPE OF ACTION RECOGNIZED BY THE CPP TARGET, INDICATING THE FLAVOR OF THE COMMAND. |
| LENGTH | 5 | LENGTH OF THE COMMAND, DEPENDENT ON THE ACTION/TOKEN, INTERPRETED BY THE CPP TARGET. |
| ADDRESS | 40 | ADDRESS THAT THE COMMAND SHOULD OPERATE ON. |
| BYTE_MASK | 8 | FURTHER OPTIONS OF A COMMAND (A BYTE MASK). |
| DATA_MASTER_ISLAND | 6 | ISLAND OF DATA MASTER. |
| DATA_MASTER | 4 | MASTER WITHIN THE ISLAND. |
| DATA_REF | 14 | PUSH-PULL ID REFERENCE INDICATING TO THE DATA MASTER WHERE TO PUSH/PULL FROM. |
| SIGNAL_MASTER | 10 | EXTENSION FOR DATA_REF AS A DATA MASTER ONLY; FOR OTHER MASTERS INDICATING WHICH MASTER WITHIN THE DATA MASTER'S ISLAND SHOULD BE SIGNALED FOR THE COMMAND. |
| SIGNAL_REF | 7 | REFERENCE WITHIN THE SIGNAL MASTER AS TO WHEN SIGNAL SHOULD BE INDICATED WITH THE COMMANDS PULL OR PUSH. |

COMMAND PAYLOAD

FIG. 5

| FIELD | WIDTH | DESCRIPTION |
|---|---|---|
| TARGET_ISLAND | 6 | ISLAND TO RETURN PULL DATA TO. |
| TARGET_PORT | 2 | IDENTIFIES THE SUB-CIRCUIT IN THE FINAL DESTINATION ISLAND THAT IS THE TARGET (OF A MULTI-TARGET ISLAND). |
| TARGET_REF | 14 | TARGET SPECIFIC REFERENCE; RETURNED WITH PULL DATA. |
| DATA_MASTER | 4 | MASTER WITHIN THE ISLAND. |
| DATA_REF | 14 | PUSH-PULL ID REFERENCE INDICATING TO THE DATA MASTER WHERE TO PUSH/PULL FROM; NORMALLY COPIED FROM THE INVOKING COMMAND. |
| SIGNAL_MASTER | 8 | EXTENSION FOR DATA_REF AS A DATA MASTER ONLY; FOR OTHER MASTERS INDICATING WHICH MASTER WITHIN THE DATA MASTER'S ISLAND SHOULD BE SIGNALED WHEN THE LAST DATA IS PULLED. |
| SIGNAL_REF | 7 | REFERENCE USABLE BY THE MASTER TO DETERMINE WHICH SIGNAL SHOULD BE INDICATED WITH THE LAST PULL DATA. |
| LENGTH | 5 | NUMBER OF 64-BIT DATA WORDS TO PULL FROM THE DATA MASTER, STARTING AT THE SPECIFIED DATA_REF. |

PULL-ID PAYLOAD

FIG. 6

| FIELD | WIDTH | DESCRIPTION |
|---|---|---|
| DATA_IS_PULL | 1 | ASSERTED FOR PULL DATA. |
| DATA_MASTER_OR_TARGET_PORT | 4 | DATA MASTER FOR PUSH DATA OR TARGET PORT FOR PULL DATA. |
| DATA_OR_TARGET_REF | 14 | DATA REF FOR PUSH DATA OR TARGET REF FOR PULL DATA. |
| SIGNAL_MASTER | 8 | ONLY USED FOR PUSH DATA; MASTER IN ISLAND TO SIGNAL IF DATA_MASTER IS NOT CTM; EXTENSION OF DATA_REF FOR DATA_MASTER OF CTM. |
| SIGNAL_REF_OR_CYCLE | 7 | SIGNAL_REF FOR PUSH DATA OR CYCLE FOR PULL DATA. |
| LAST | 1 | ASSERTED WITH THE LAST WORD OF DATA FOR PULL OR PUSH DATA. |
| DATA | 64 | 64-BITS OF PULL/PUSH DATA. |
| DATA_ERROR | 2 | ONE BIT PER 32-BITS OF DATA TO INDICATE AN UNCORRECTABLE ERROR. |
| DATA_VALID | 2 | ONE BIT PER 32-BITS OF DATA TO INDICATE, ON PUSH, THAT THE DATA IS TO BE WRITTEN TO THE DATA_MASTER. |
| NO_SPLIT | 1 | FOR PUSH DATA ONLY, ASSERTED FOR SIGNALING TO INDICATE THAT BOTH SIGNAL_REF AND SIGNAL_REF1 ARE TO BE INDICATED TO THE SIGNALED MASTER. |

DATA PAYLOAD

FIG. 7

| FIELD | WIDTH | DESCRIPTION |
|---|---|---|
| DATA_IS_PULL | 1 | ASSERTED FOR PULL DATA. |
| TARGET_PORT | 2 | IDENTIFIES THE SUB-CIRCUIT IN THE FINAL DESTINATION ISLAND THAT IS THE TARGET (OF A MULTI-TARGET ISLAND). |
| TARGET_REF | 14 | TARGET SPECIFIC REFERENCE, RETURNED WITH PULL DATA. |
| CYCLE-OF_PULL | 7 | CYCLE OF PULL DATA. |
| LAST | 1 | ASSERTED WITH THE LAST WORD OF PULL DATA. |
| DATA | 64 | 64-BITS OF PULLED DATA FROM THE DATA MASTER. |
| DATA_ERROR | 2 | ONE BIT PER 32-BITS OF PULLED DATA TO INDICATE AN UNCORRECTABLE ERROR FROM THE DATA_MASTER DATA SOURCE. |

DATA PAYLOAD (FOR A PULL)

FIG. 8

| FIELD | WIDTH | DESCRIPTION |
|---|---|---|
| DATA_IS_PULL | 1 | DEASSERTED FOR PUSH DATA. |
| DATA_MASTER | 4 | PUSH ID WITHIN THE ISLAND OF DATA MASTER THE DATA IS DESTINED FOR. |
| DATA_REF | 14 | REFERENCE WITHIN DATA MASTER AS TO WHERE TO PUSH FROM. |
| SIGNAL_MASTER | 8 | FOR CTM AS A DATA MASTER ONLY THIS IS AN EXTENSION FOR DATA_REF; FOR OTHER MASTERS INDICATING WHICH MASTER WITHIN THE DATA MASTER'S ISLAND SHOULD BE SIGNALED WHEN THE LAST DATA IS PUSHED. |
| SIGNAL_REF | 7 | REFERENCE WITHIN THE SIGNAL MASTER AS TO WHICH SIGNAL SHOULD BE INDICATED WITH THE LAST PUSH DATA. |
| LAST | 1 | ASSERTED WITH THE LAST WORD OF PUSH DATA. |
| DATA | 64 | 64-BITS OF PUSH DATA FROM THE DATA MASTER. |
| DATA_ERROR | 2 | ONE BIT PER 32-BITS OF PUSHED DATA TO INDICATE AN UNCORRECTABLE ERROR FROM THE DATA_MASTER DATA SOURCE. |
| DATA_VALID | 2 | ONE BIT PER 32-BITS OF DATA TO INDICATE THAT THE DATA IS TO BE WRITTEN TO THE DATA_MASTER. |
| NO_SPLIT | 1 | ASSERTED FOR SIGNALING TO INDICATE THAT BOTH SIGNAL_REF AND SIGNAL_REF1 ARE TO BE INDICATED TO THE SIGNALED MASTER. |

DATA PAYLOAD (FOR A PUSH)

FIG. 9

A PAIR OF MICROENGINES COMMUNICATE
USING A RING OF BUFFERS

ME ISLAND

RING OF BUFFERS

RING DESCRIPTORS

T <= (T+1) MODULO SIZE

WRITE A POINTER (TO WHERE ARP RESPONSE PACKET IS STORED IN MEMORY) INTO SRAM AT ADDRESS: BASE + T

WHAT THE RING OPERATION STAGE DOES
IN CARRYING OUT A "PUT INTO RING" COMMAND

FIG. 16

READ A POINTER (TO WHERE ARP RESPONSE PACKET IS STORED IN MEMORY) FROM SRAM AT ADDRESS: BASE + H

H <= (H+1) MODULO SIZE

WHAT THE RING OPERATION STAGE DOES
IN CARRYING OUT A "GET FROM RING" COMMAND

FIG. 17

CLUSTER LOCAL SCRATCH ("PUT INTO RING" EXAMPLE)

CLUSTER LOCAL SCRATCH ("GET FROM RING" EXAMPLE)

CLUSTER LOCAL SCRATCH ("WRITE TO MEMORY" EXAMPLE)

"PUT INTO RING" FLOWCHART

"GET FROM RING" FLOWCHART

PUT INTO RING WITH LOW PRIORITY FLOWCHART

"GET FROM ONE OF A SET OF RINGS" FLOWCHART

SSB PERIPHERALS BLOCK

US 9,069,602 B2

TRANSACTIONAL MEMORY THAT SUPPORTS PUT AND GET RING COMMANDS

TECHNICAL FIELD

The described embodiments relate generally to network processor integrated circuits employing transactional memories and to related methods.

BACKGROUND INFORMATION

A network processor is a device that executes programs to handle packet traffic in a data network. A network processor is also often referred to as a network flow processor or simply a flow processor. Examples include network processor integrated circuits on router line cards and in other network equipment. In one example, a network processor integrated circuit is capable of receiving packets, classifying and performing operations on the packets and the associated packet data, and transmitting packets. Various processors on the integrated circuit are called upon to perform various types of processing and analysis on the packets and associated packet data as the packets flow through the network processor. As throughput requirements increase, ways of improving such network processor integrated circuits are sought.

SUMMARY

A transactional memory has a command/push/pull (CPP) bus interface. The transactional memory includes a ring buffer control circuit and a memory unit. A plurality of rings of buffers is stored in the memory unit. Each ring has a head buffer and a tail buffer. The used buffers of a ring are stored in contiguous locations in the memory. In one example, the ring control circuit is pipelined. The pipeline has a ring operation stage, a read stage, a wait stage, a pull stage, an execute stage, and a write stage. The ring operation stage may be referred to as a "ring operation portion". The read stage, wait stage, pull stage, execute stage, and write stages may be referred to as a "memory access portion". The ring operation stage maintains, for each ring, a ring descriptor. A ring descriptor for a ring includes a head pointer that points to the head buffer of the ring, a tail pointer that points to the tail buffer of the ring, a base address value that identifies the beginning of the buffer space in the memory unit (where the block of used and unused buffers of the ring are stored), and a ring size value that indicates the size of the ring (the size of the block of the used and unused buffers of the ring). As values are put onto the rings, and as values are removed from the rings, the ring operation stage maintains the head and tail pointers so that the head pointer for a ring continues to point to the head buffer of the ring, and so that the tail pointer for a ring continues to point to the tail buffer of the ring.

In a first novel aspect, an entity external to the transactional memory (for example, a processor such as a microengine) can supply a "put into ring" command via the bus interface to the transactional memory. The ring operation stage of the pipeline of the transactional memory uses the head and tail pointers for the ring to determine if the ring identified by the "put into ring" command is full. If the ring is full, then no additional buffer value is put into the ring, but rather an error message is returned to the external entity via the bus interface. If, on the other hand, the ring identified by the "put into ring" command is not full, then the transactional memory puts a supplied value (supplied by the external entity) into the tail buffer of the ring and adjusts the tail pointer for the ring to point to the new tail buffer.

Similarly, an entity external to the transactional memory can supply a "get from ring" command via the bus interface to the transactional memory. The ring operation stage uses the head and tail pointers to determine if the ring identified by the "get from ring" command is empty. If the ring is empty, then no buffer value is taken off the ring, but rather an error message is returned to the external entity. If, on the other hand, the ring identified by the get from ring command is not empty, then the transactional memory takes the value stored in the head buffer off the ring, outputs the read value to the external entity via the bus interface, and adjusts the head pointer to point to the new head buffer.

In a second novel aspect, an entity external to the transactional memory can supply a "put into ring with low priority" command via the bus interface to the transactional memory. The ring operation stage uses the head and tail pointers to determine if the ring identified by the "put into ring with low priority" command has at least a predetermined amount of free buffer space (for example, the ring is less than half full). If the ring is determined not to have the predetermined amount of free buffer space, then no additional value is put into the ring, but rather an error message is returned to the external entity via the bus interface. If, on the other hand, the ring identified by the "put into ring with low priority" command is determined to have the predetermined amount of free buffer space, then the transactional memory puts a supplied value (supplied by the external entity) into the tail buffer of the ring and adjusts the tail pointer to point to the new tail buffer.

In a third novel aspect, an entity external to the transactional memory can supply a "get from one of a set of rings" command via the bus interface to the transactional memory. The command identifies a set of rings. The rings have a defined priority order. The ring operation stage uses the head and tail pointers for each ring of the set to determine if the ring is empty. If all the rings of the set are empty, then no value is taken off any ring, but rather an error message is returned to the external entity via the bus interface. If, on the other hand, at least one of the rings is not empty, then the head buffer of the highest priority non-empty ring is read, the read value is supplied back to the external entity via the bus interface, and the head pointer for the ring that was accessed is updated to point to the new head buffer of that ring.

In some examples, not only is an error message returned to the external entity if a requested ring operation cannot be performed, but also an okay message is returned to the external entity if the required ring operation was successfully performed. The okay message can contain additional information. In one example, the okay message indicates which ring was accessed, and indicate how much buffer space is available in the accessed ring. In addition to ring commands, the pipeline stages other than the ring operation stage are usable to carry out other transactional memory commands. One transactional memory command is a read of a specified memory location in the memory unit. Another transactional memory command is a write to a specified memory location in the memory unit.

Further details and embodiments and techniques are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 4 is diagram of a bus transaction value communicated across the CPP data bus.

FIG. 5 is a table listing the parts of the command payload of the bus transaction value of FIG. 3, when the bus transaction value is a command sent across the command mesh of the CPP data bus.

FIG. 6 is a table listing the width and description of each field within the payload of a bus transaction value sent across the pull-id mesh of the CPP data bus.

FIG. 7 is a table listing the width and description of each field within the payload of a bus transaction value sent across the data0 or data1 mesh of the CPP data bus.

FIG. 8 is a table listing the width and description of each field within the data payload of a pull transaction.

FIG. 9 is a table listing the width and description of each field within the data payload of a push transaction.

FIG. 16 is a diagram that shows operations carried out by the ring operation stage in carrying out a "put into ring" command.

FIG. 17 is a diagram that shows operations carried out by the ring operation stage in carrying out a "get from ring" command.

DETAILED DESCRIPTION

Reference will now be made in detail to background examples and some embodiments of the invention, examples of which are illustrated in the accompanying drawings.

Figure 1:
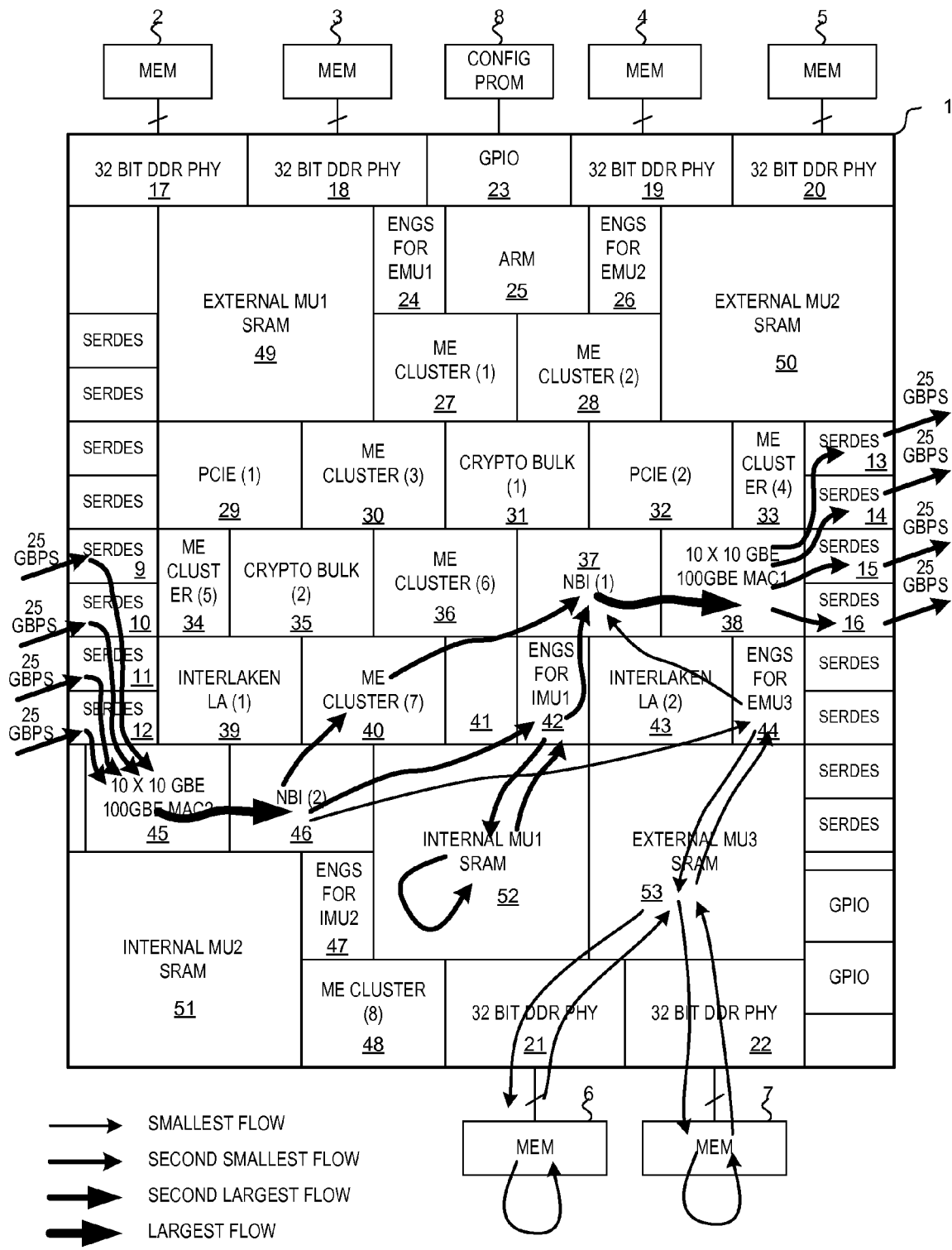
FIG. 1 is a top-down diagram of an Island-Based Network Flow Processor (IB-NFP) integrated circuit 1 and associated memory circuits 2-7 in an MPLS router application.

FIG. 1 is a top-down diagram of an Island-Based Network Flow Processor (IB-NFP) integrated circuit 1 and associated memory circuits 2-7. The IB-NFP integrated circuit sees use in network appliances such as, for example, an MPLS router. IB-NFP integrated circuit 1 includes many I/O (input/output) terminals (not shown). Each of these terminals couples to an associated terminal of the integrated circuit package (not shown) that houses the IB-NFP integrated circuit. The integrated circuit terminals may be flip-chip microbumps and are not illustrated. Alternatively, the integrated circuit terminals may be wire bond pads. The IB-NFP integrated circuit 1 is typically disposed on a line card along with optics transceiver circuitry, PHY circuitry and external memories.

SerDes circuits 9-12 are the first set of four SerDes circuits that are used to communicate with external networks via the PHY circuitry, the optics transceivers, and optical cables. SerDes circuits 13-16 are the second set of four SerDes circuits that are used to communicate with a switch fabric (not shown) of the MPLS router. Each of these SerDes circuits 13-16 is duplex in that it has a SerDes connection for receiving information and it also has a SerDes connection for transmitting information. Each of these SerDes circuits can communicate packet data in both directions simultaneously at a sustained rate of 25 Gbps. IB-NFP integrated circuit 1 accesses external memory integrated circuits 2-7 via corresponding 32-bit DDR physical interfaces 17-22, respectively. IB-NFP integrated circuit 1 also has several general purpose input/output (GPIO) interfaces. One of these GPIO interfaces 23 is used to access external PROM 8.

In addition to the area of the input/output circuits outlined above, the IB-NFP integrated circuit 1 also includes two additional areas. The first additional area is a tiling area of islands 24-48. Each of the islands is either of a full rectangular shape, or is half the size of the full rectangular shape. For example, the island 29 labeled "PCIE (1)" is a full island. The island 34 below it labeled "ME CLUSTER (5)" is a half island. The functional circuits in the various islands of the tiling area are interconnected by: 1) a configurable mesh Command/Push/Pull (CPP) data bus, 2) a configurable mesh control bus, and 3) a configurable mesh event bus. Each such mesh bus extends over the two-dimensional space of islands with a regular grid or "mesh" pattern.

In addition to this tiling area of islands 24-48, there is a second additional area of larger sized blocks 49-53. The functional circuitry of each of these blocks is not laid out to consist of islands and half-islands in the way that the circuitry of islands 24-48 is laid out. The mesh bus structures do not extend into or over any of these larger blocks. The mesh bus structures do not extend outside of island 24-48. The functional circuitry of a larger sized block may connect by direct dedicated connections to an interface island and through the interface island achieve connectivity to the mesh buses and other islands.

The arrows in FIG. 1 illustrate an operational example of IB-NFP integrated circuit 1 within the MPLS router. 100 Gbps packet traffic is received onto the router via an optical cable (not shown), flows onto the line card and through an optics transceiver (not shown), flows through a PHY integrated circuit (not shown), and is received onto IB-NFP integrated circuit 1, is spread across the four SerDes I/O blocks 9-12. Twelve virtual input ports are provided at this interface. The symbols pass through direct dedicated conductors from the SerDes blocks 9-12 to ingress MAC island 45. Ingress MAC island 45 converts successive symbols delivered by the physical coding layer into packets by mapping symbols to octets, by performing packet framing, and then by buffering the resulting packets for subsequent communication to other processing circuitry. The packets are communicated from MAC island 45 across a private inter-island bus to first NBI (Network Bus Interface) island 46. In addition to the optical cable that supplies packet traffic into the line card, there is another optical cable that communicates packet traffic in the other direction out of the line card.

For each packet received onto the IB-BPF in the example of FIG. 1, the functional circuitry of first NBI island 46 (also called the ingress NBI island) examines fields in the header portion of the packet to determine what storage strategy to use to place the packet into memory. In one example, first NBI island 46 examines the header portion and from that determines whether the packet is an exception packet or whether the packet is a fast-path packet. One type of exception packet is an ARP response packet. If the packet is an exception packet then the first NBI island 46 determines a first storage strategy to be used to store the packet so that relatively involved exception processing can be performed efficiently, whereas if the packet is a fast-path packet then the NBI island 46 determines a second storage strategy to be used to store the packet for more efficient transmission of the packet from the IB-NFP. First NBI island 46 examines a packet header, performs packet preclassification, determines that the packet is a fast-path packet, and determines that the header portion of the packet should be placed into a CTM (Cluster Target Memory) in ME (Microengine) island 40. The header portion of the packet is therefore communicated across the configurable mesh data bus from NBI island 46 to ME island 40. The CTM is tightly coupled to microengines in the ME island 40. The ME island 40 determines header modification and queuing strategy for the packet based on the packet flow (derived from packet header and contents) and the ME island 40 informs a second NBI island 37 (also called the egress NBI island) of these. The payload portions of fast-path packets are placed into internal SRAM (Static Random Access Memory) MU block 52 and the payload portions of exception packets are placed into external DRAM 6 and 7.

Half island 42 is an interface island through which all information passing into, and out of, SRAM MU block 52 passes. The functional circuitry within half island 42 serves as the interface and control circuitry for the SRAM within block 52. For simplicity purposes in the discussion below, both half island 42 and MU block 52 may be referred to together as the MU island, although it is to be understood that MU block 52 is actually not an island as the term is used here but rather is a block. The payload portion of the incoming fast-path packet is communicated from NBI island 46, across the configurable mesh data bus to SRAM control island 42, and from control island 42, to the interface circuitry in block 52, and to the internal SRAM circuitry of block 52. The internal SRAM of block 52 stores the payloads so that they can be accessed for flow determination by the ME island.

In addition, a preclassifier in the first NBI island 46 determines that the payload portions for others of the packets should be stored in external DRAM 6 and 7. For example, the payload portions for exception packets are stored in external DRAM 6 and 7. Interface island 44, external MU SRAM block 53, and DDR PHY I/O blocks 21 and 22 serve as the interface and control for external DRAM integrated circuits 6 and 7. The payload portions of the exception packets are therefore communicated across the configurable mesh data bus from first NBI island 46, to interface and control island 44, to external MU SRAM block 53, to 32-bit DDR PHY I/O blocks 21 and 22, and to external DRAM integrated circuits 6 and 7. At this point in the operational example, the packet header portions and their associated payload portions are stored in different places. The header portions of both fast-path and exception packets are stored in the CTM (Cluster Target Memory) in ME island 40. The payload portions of fast-path packets are stored in internal SRAM in MU block 52, whereas the payload portions of exception packets are stored in external SRAM in external DRAMs 6 and 7.

ME island 40 informs second NBI island 37 (the egress NBI island) where the packet headers and the packet payloads can be found and provides the second NBI island 37 with an egress packet descriptor for each packet. The egress packet descriptor indicates a queuing strategy to be used for the associated packet. Second NBI island 37 uses the egress packet descriptors to read the packet headers and any header modification from ME island 40 and to read the packet payloads from either internal SRAM 52 or external DRAMs 6 and 7. Second NBI island 37 places packet descriptors for packets to be output into the correct order. For each packet that is then scheduled to be transmitted, the second NBI island 37 uses the packet descriptor to read the header portion and any header modification and the payload portion and to assemble the packet to be transmitted. The header modification is not actually part of the egress packet descriptor, but rather it is stored with the packet header by the ME when the packet is presented to the NBI. The second NBI island 37 then performs any indicated packet modification on the packet. The resulting modified packet then passes from second NBI island 37 and to egress MAC island 38.

Egress MAC island 38 buffers the packets, and converts them into symbols. The symbols are then delivered by conductors from the MAC island 38 to the four SerDes I/O blocks 13-16. From SerDes I/O blocks 13-16, the 100 Gbps outgoing packet flow passes out of the IB-NFP integrated circuit 1 and to the switch fabric (not shown) of the router. Twelve virtual output ports are provided in the example of FIG. 1.

General Description of the CPP Data Bus: A Command-Push-Pull (CPP) data bus structure interconnects functional circuitry in the islands of the IB-NFP integrated circuit 1. Within each full island, the CPP data bus actually includes four mesh bus structures, each of which includes a crossbar switch that is disposed in the center of the island, and each of which includes six half links that extend to port locations at the edges of the island, and each of which also includes two links that extend between the crossbar switch and the functional circuitry of the island. These four mesh bus structures are referred to as the command mesh bus, the pull-id mesh bus, and data0 mesh bus, and the data1 mesh bus. The mesh buses terminate at the edges of the full island such that if another identical full island were laid out to be adjacent, then the half links of the corresponding mesh buses of the two islands would align and couple to one another in an end-to-end collinear fashion. For additional information on the IB-NFP integrated circuit, the IB-NFP's islands, the CPP data bus, the CPP meshes, operation of the CPP data bus, and the different types of bus transactions that occur over the CPP data bus, see: U.S. patent application Ser. No. 13/399,433 entitled "Staggered Island Structure in an Island-Based Network Flow Processor" filed on Feb. 17, 2012 (the entire subject matter of which is incorporated herein by reference).

Figure 2:
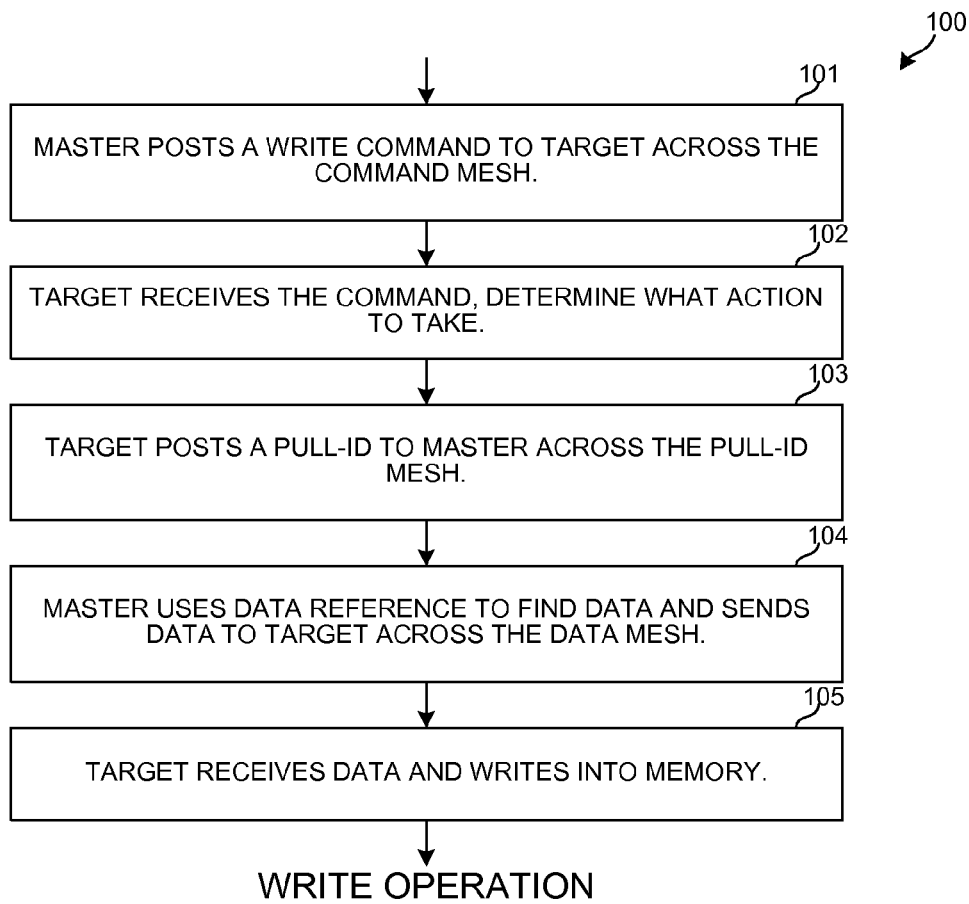
FIG. 2 is a flowchart of a write operation that can be performed across a CPP data bus of the IB-NFP integrated circuit of FIG. 1.

General Description of a Write That Results in a Pull: In one example of a CPP bus transaction, a master on one island can use a data bus interface (on the master's island) to perform a write operation over the CPP bus to a target on another island, where the target is made to respond by performing a pull operation. FIG. 2 is a flowchart of such a write operation 100. First, the master uses its data bus interface to output a bus transaction value onto the command mesh (step 101) of the CPP data bus. The format of the bus transaction value is as set forth in FIG. 4. A bus transaction value 54 includes a metadata portion 55 and a payload portion 56 as shown. The metadata portion 55 includes a final destination value 57 and a valid bit 58. The bus transaction value is a write command and is said to be "posted" by the master onto the command mesh. The metadata portion includes the 6-bit final destination value. This final destination value identifies an island by number, where the island identified is the final destination of the bus transaction value. The final destination value is used by the various crossbar switches of the command mesh structure to route the bus transaction value (i.e., the command) from the master to the appropriate target. All bus transaction values on the command mesh that originate from the same island that have the same final destination value will traverse through the configurable command mesh along the same one path all the way to the indicated final destination island.

A final destination island may include more than one potential target. As indicated in FIG. 5, the 4-bit target field of payload portion indicates which one of these targets in the destination island it is that is the target of the command. The 5-bit action field of the payload portion indicates that the command is a write. The 14-bit data reference field is a reference usable by the master to determine where in the master the data is to be found. The address field indicates an address in the target where the data is to be written. The length field indicates the amount of data.

The target receives (step 102 of FIG. 2) the write command from the command mesh and examines the payload portion of the write command. From the action field, the target determines that it is to perform a write action. To carry out this write action, the target posts a bus transaction value called a pull-id (step 103 of FIG. 2) onto the pull-id mesh. FIG. 4 shows the format of the overall bus transaction value, and FIG. 6 shows the format of the pull-id payload. The final destination field of the metadata portion indicates the island where the master is located. The target port field identifies which sub-circuit target it is within the target's island that is the target of the command. The pull-id is communicated through the pull-id mesh from the target back to the master.

The master receives the pull-id from the pull-id mesh and uses the content of the data reference field of the pull-id to find the data (step 104 of FIG. 2). In the overall write operation, the master knows the data it is trying to write into the target. The data reference value that is returned with the pull-id is used by the master as a flag to match the returning pull-id with the write operation that the target had previously initiated. The master responds by sending the identified data to the target across one of the data meshes data0 or data1 as a "pull" data bus transaction value. The term "pull" means that the data of the operation passes from the master to the target. The term "push" means that the data of the operation passes from the target to the master. The format of the "pull" data bus transaction value sent in this sending of data is also as indicated in FIG. 4, whereas the format of the payload portion in the case of the payload being pull data is as set forth in FIG. 8. In the example being described of a pull, the first bit of the payload portion is asserted. This bit being a digital high indicates that the transaction is a data pull as opposed to a data push. The target then receives the data pull bus transaction value across the data1 or data0 mesh. The data received by the target as the data for the write is the content of the data field of the pull data payload portion. The target writes the received data into memory (step 105 of FIG. 2)

Figure 3:
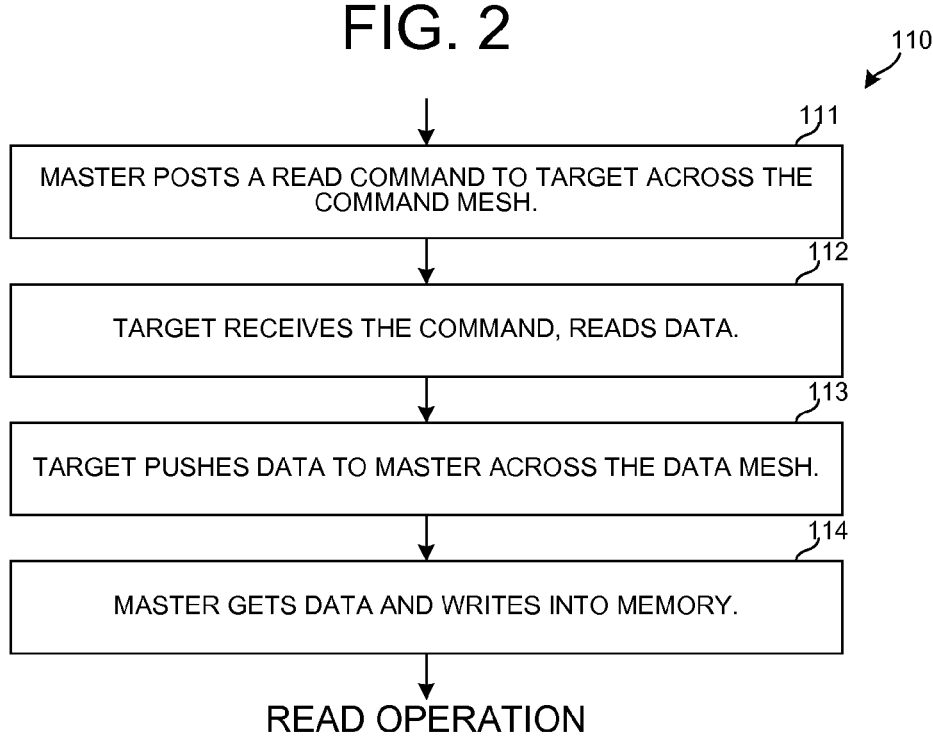
FIG. 3 is a flowchart of a read operation that can be performed across a CPP data bus of the IB-NFP integrated circuit of FIG. 1.

General Description of a Read That Results in a Push: In another example, a master can use the data bus interface (on the master's island) to perform a read operation over the CPP bus from a target on another island, where the target is made to respond by performing a push operation. FIG. 3 is a flowchart of such a read operation 110. First, the master uses the data bus interface to "post" (step 111 of FIG. 3) a bus transaction value onto the command mesh bus of the configurable mesh CPP data bus. In this case, the bus transaction value is a read command to read data from the target. The format of the read command is as set forth in FIGS. 4 and 5. The read command includes a metadata portion and a payload portion. The metadata portion includes the 6-bit final destination value that indicates the island where the target is located. The action field of the payload portion of the read command indicates that the command is a read. The 14-bit data reference field is usable by the master as a flag to associate returned data with the original read operation the master previously initiated. The address field in the payload portion indicates an address in the target where the data is to be obtained. The length field indicates the amount of data.

The target receives (step 112 of FIG. 3) the read command and examines the payload portion of the command. From the action field of the command payload portion the target determines that it is to perform a read action. To carry out this read action, the target uses the address field and the length field to obtain the data requested. The target then pushes the obtained data (step 113 of FIG. 3) back to the master across data mesh data1 or data0. To push the data, the target outputs a push bus transaction value onto the data1 or data0 mesh. FIG. 4 sets forth the format of the overall push bus transaction value, whereas FIG. 9 sets forth the format of the payload portion of this push bus transaction value. The first bit of the payload portion indicates that the bus transaction value is for a data push, as opposed to a data pull. The master receives the bus transaction value of the data push from the data mesh bus. The master then uses the data reference field of the push bus transaction value to associate the incoming data with the original read command, and from the original read command determines where the pushed data (data in the data field of the push bus transaction value) should be written into the master. The master then writes (step 114 of FIG. 3) the content of the data field into the master's memory at the appropriate location.

Figure 10:
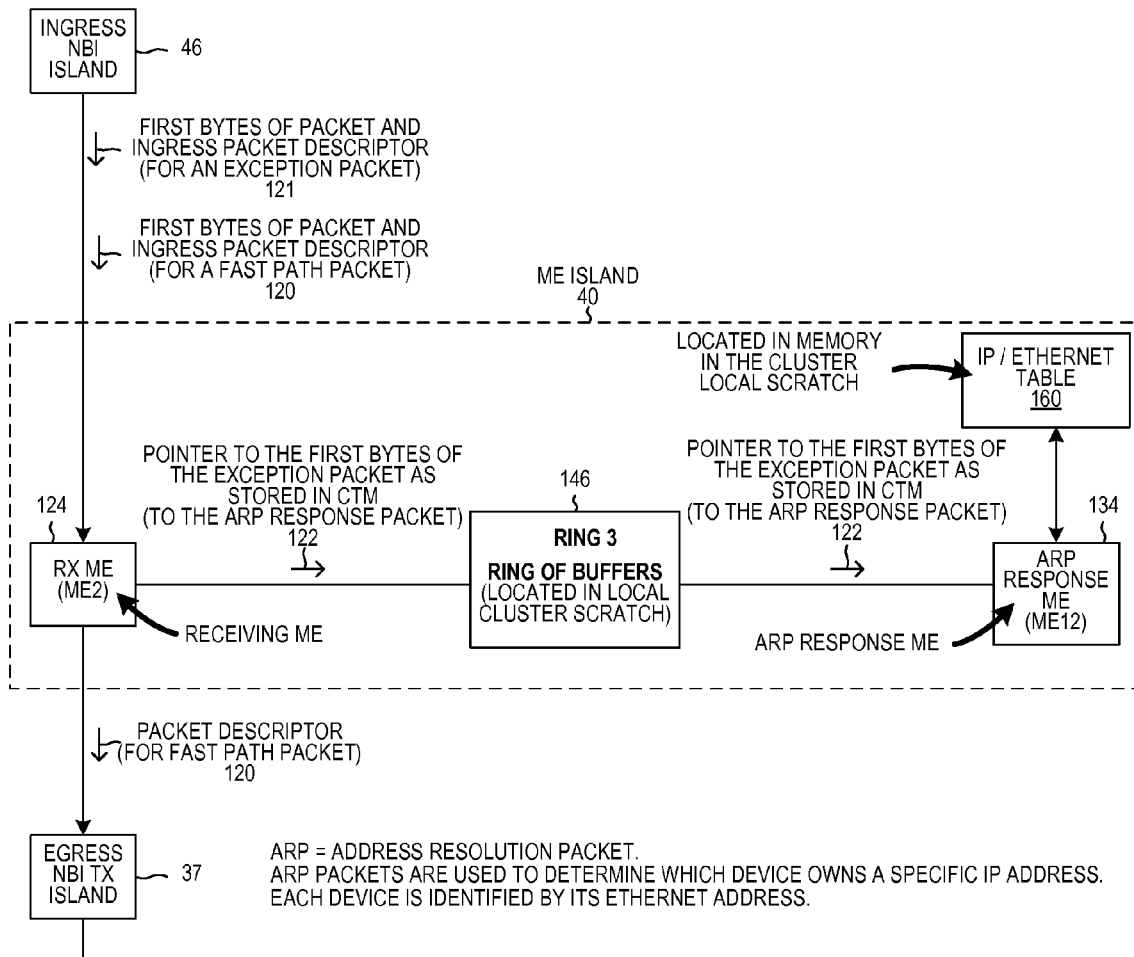
FIG. 10 is a diagram that shows how a pair of microengines (MEs) communicates using a ring of buffers.

FIG. 10 is a diagram that illustrates the flow of packet information from the first NBI island 37 to the ME island 40. The flow of packet information includes the first bytes of a fast path packet (that includes the header portion of the packet) and an ingress packet descriptor for the fast path packet 120. This information 120 is received by an ME 124 of ME island 40. ME 124 (referred to here as the RX ME) determines that the associated packet is a fast path packet, so the packet descriptor is forwarded on to the second NBI island 37 (the egress NBI island). The payload of the fast path packet is stored in internal SRAM in MU block 52 as described above. The second NBI island 37 uses the packet descriptor 120 to access and to perform output processing on the fast path packet.

The flow of packet information also includes the first bytes (the header portion of the packet) of an exception packet and an ingress packet descriptor for the exception packet 121. In this case, the exception packet is an ARP response packet. This information 121 is received by the RX ME 124 of ME island 40. The RX ME determines that the associated packet is an exception packet and that further exception processing should be performed by another ME on the island. The other ME 134 is referred to here as the ARP response ME. RX ME 124 puts a pointer 122 (to where the header of the exception packet is stored in CTM 138) into a ring 146 of buffers. This ring 146 is stored on the same island as the RX ME and as the ARP response ME. The ARP response ME 134 then gets the pointer 122 from the ring 146 and uses the pointer 122 to retrieve the header of the ARP response packet from CTM 138 where it is stored. From the header of the ARP response packet, the ARP response ME 134 learns the ethernet source address that is associated with the IP source address of the sender of the ARP response packet. The ARP response ME as a master then posts a write command to the CLS as a target, to writes the ethernet source address into an IP-to-Ethernet table 160 in memory unit 161 of the CLS in the ME island 40. As a result, the table indicates the ethernet source address that corresponds to the IP source address.

Figure 11:
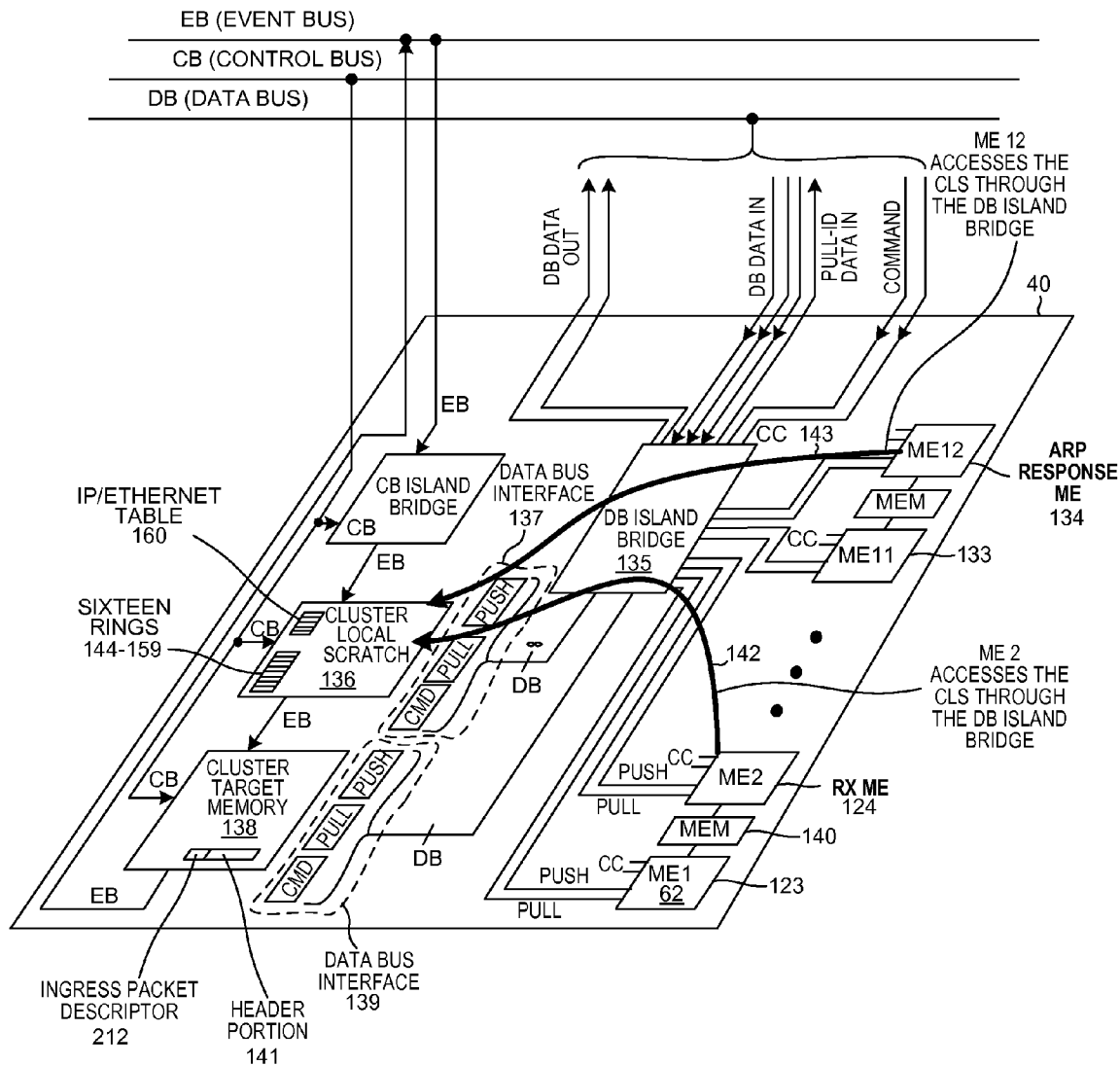
FIG. 11 is a simplified diagram of a microengine island (ME island) of the IB-NFP integrated circuit of FIG. 1.

FIG. 11 is a more detailed diagram of ME island 40. In addition to other parts, the ME island 40 includes six pairs of microengines 123-134, a data bus island bridge 135, the Cluster Local Scratch (CLS) 136, a data bus interface 137 for the CLS, the Cluster Target Memory (CTM) 138, and a data bus interface 139 for the CTM. Each pair of microengines shares a memory containing program code for the microengines. For example, memory 140 is the memory shared by the first two microengines 123 and 124. In the operational flow of FIG. 1, packet headers and the associated preclassification results are DMA transferred from the first NBI island 46 across the configurable mesh data bus and into Cluster Target Memory (CTM) 138. A DMA engine in the first NBI island 46 is the master and CTM 138 in ME island 40 is the target for this transfer. The packet header portions and the associated ingress packet descriptors pass into the ME island 40 via data bus island bridge 135 and data bus interface circuitry 139. Once in the CTM 138, the header portions are analyzed by the RX ME 124. CLS 136 is a transactional memory that includes, among other parts, sixteen rings 144-159 of buffers. RX ME 124 puts a pointer to the header portion 141 of the ARP response packet into ring 3 by supplying a "put into ring" command to the CLS 136 via DB island bridge 135. Arrow 142 indicates this supplying of this "put into ring" command through the DB island bridge to the CLS. The ARP response ME 134 then supplies a "get from ring" command to the CLS 136 to get the pointer from ring 3. The ARP response ME 134 as a master supplies the "get from ring" command to the CLS 136 as a target via DB island bridge 135. Arrow 143 indicates this supplying of the "get from ring" command through DB island bridge 135 to the CLS 136. Ring 3 is therefore used as a communication mechanism between RX ME 124 and ARP response ME 134.

Figure 12:
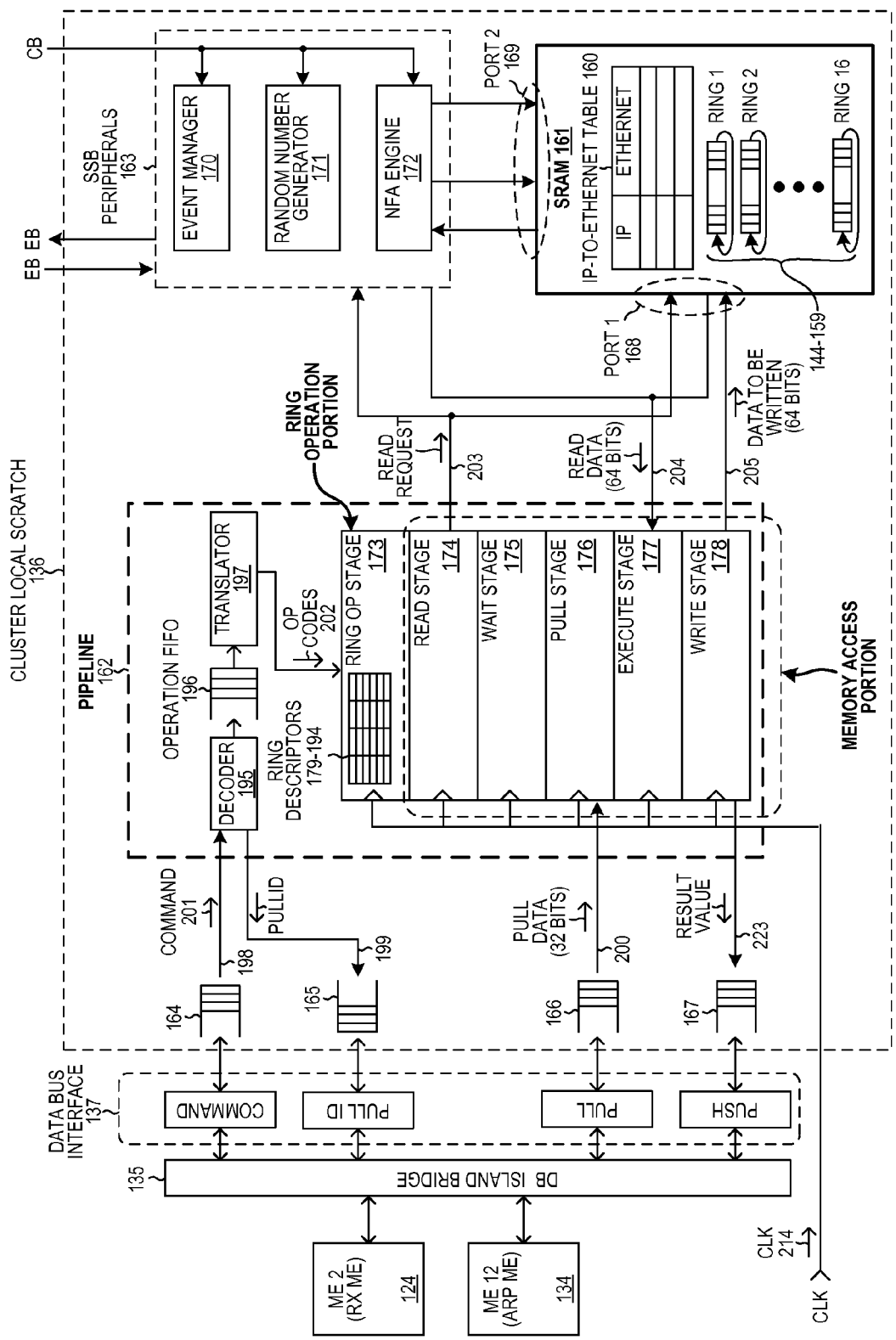
FIG. 12 is a simplified diagram of the Cluster Local Scratch (CLS) within the ME island of FIG. 11.

FIG. 12 is a diagram that shows CLS 136 in further detail. CLS 136 includes a memory unit 161, a control circuit 162 (a control pipeline), a SSB peripherals block 163, and FIFOs 164-167. The memory unit 161 in this case is two-ported SRAM that has a first port 168 and a second port 169. The memory unit 161 stores, among other things, the sixteen rings 144-159 of buffers as well as the IP-to-Ethernet table 160. SSB peripherals block 163 includes an event manager 170, a random number generator 171, and a Non-deterministic Finite state Automaton (NFA) engine 172. Control circuit 162 in this case is a pipeline that includes a ring operation stage 173, a read stage 174, a wait stage 175, a pull stage 176, an execute stage 177 and a write stage 178. The ring operation stage 173 maintains and stores sixteen ring descriptors 179-194. There is one ring descriptor for each ring in memory unit 161, where the ring descriptor includes a base address value, a tail pointer, a head pointer, and a ring size value. In addition, the pipeline 162 is also considered to include a decoder 195, an operation FIFO 196, and a translator 197.

General operation of the CLS 136 involves a flow of commands that are sent by a master to the CLS as a target via the DB island bridge 135 and the data bus interface 137. A master (for example RX ME 124 or APR response ME 134) in the same ME island can supply a command to the local CLS as a target using the same CPP data bus commands and operations as described above just as if the CLS were outside the island in another island, except that bus transaction values do not have a final destination value. The bus transaction values do not leave the island and therefore do not need that final destination information. The data bus interface 137 is the target of the bus transaction. The resulting flow of commands to the CLS is pushed into FIFO 164. One at a time, the commands are presented to the pipeline 162 via conductors 198. For a command passing into the pipeline, the decoder 195 determines if the operation specified by the command will require data to be obtained (i.e., pulled) in order for the operation to be carried out. If the result of the decoding indicates that data should be pulled, then information to generate a pull-id bus transaction value is generated by the decoder 195 and is sent across conductors 199 and into FIFO 165. The data bus interface 137 uses this information from FIFO 165 to generate an appropriate pull-id transaction value. The pull-id transaction value is communicated via DB island bridge 135 to the master (for example, the RX ME or the ARP response ME). The master in turn returns the pull data via DB island bridge 135 and the data bus interface 137 target. The pull data pass through pull FIFO 166 and conductors 200 back to the pipeline. It generally takes multiple clock cycles for the pull data to be returned.

Meanwhile, after decoding by decoder 195, the command 201 passes through operation FIFO 196 and is translated into a set of opcodes 202 by translator 197. There is one opcode for each stage of the pipeline. Each opcode determines what a corresponding pipeline stage will do during the clock cycle when the command is being processed by that stage. For example, if the command is a ring command, then the ring operation stage consults information in the ring descriptors 179-194. Based on this information, the ring operation stage may, for example, output the address of the head buffer of a ring, output the address of the tail buffer of a ring, determine if a ring is empty, and/or determine if a ring is full. If the command requires a value to be read from the peripherals block 163 or from memory unit 161, then the read stage 173 outputs a read request via conductors 203. After a pull-id has been posted to the DB island bridge 135 as described above, it may take a substantial period of time for the requested pull data to be returned via pull FIFO 166. The wait stage 175 is controlled by one of the opcodes to slow the pipeline long enough for the returned pull data be present on the input of the pull stage 176 at the time when processing of the command is being performed by the pull stage. Any data that is returned as a result of a read request on conductors 203 is received via conductors 204 on the input of the execute stage 177. The execute stage 177 then generates an output value as a function of information from the prior stages, pull data and/or data read from the peripherals or the memory unit. If the command requires an output value to be written to the memory unit, then the write stage 178 causes an appropriate write to occur across conductors 205. Likewise, if the command requires an output value to be returned to the command master across the DB island bridge, then the write stage 178 causes an appropriate bus transaction value to be supplied to the DB island bridge 135 via write FIFO 167.

The stages 173-178 are pipelined. In a first cycle of the clock signal CLK, the ring operation stage performs its functions required by the command, in a second cycle of the clock signal CLK the read stage performs its function required by the command, in a third cycle of the clock signal CLK the wait stage performs its function required by the command, in a fourth cycle of the clock signal CLK the pull stage performs its function required by the command, in a fifth cycle of the clock signal CLK the execute stage performs its function required by the command, and in a sixth cycle of the clock signal CLK the write stage performs its function required by the command. A different command is output from the operation FIFO 196 each cycle of the clock signal, so one command can be executed by the pipeline each cycle.

Figure 13:
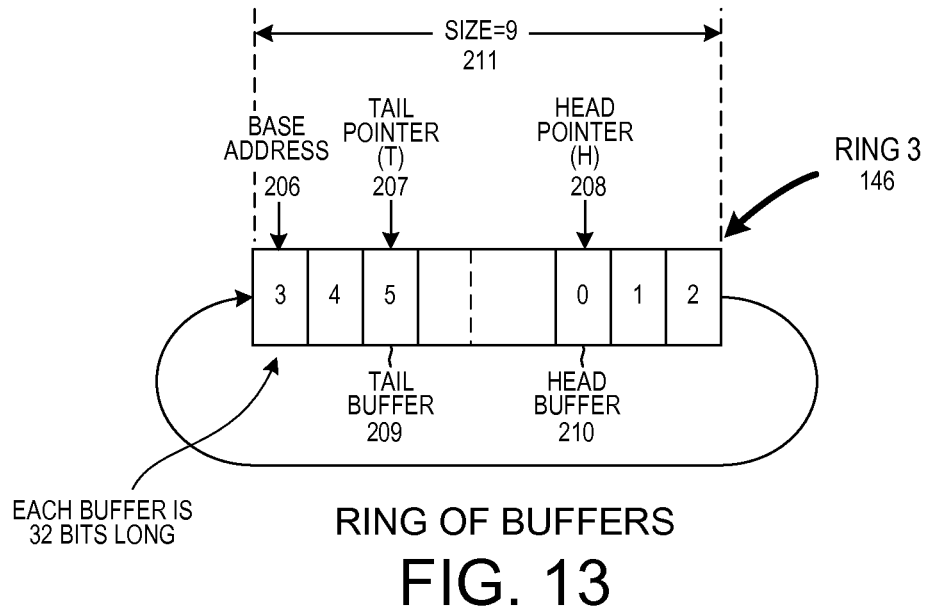
FIG. 13 is a diagram of a ring of buffers stored in the CLS of the ME island of FIG. 11.

FIG. 13 is a diagram of the third ring 146 (ring 3) of buffers. The number of buffers in a ring is configurable. In one example, each buffer is a number of contiguous 512 memory locations in memory unit 161, where each memory location is 32 bits long. All the buffers of a ring are contiguous. The contiguous buffers of a ring therefore are a block of memory locations in memory unit 161. The tail pointer T 207 is a nine bit offset value which when added to the five bit base address 206 is the fourteen bit address of the tail buffer 209. The head pointer 208 is a nine bit offset which when added to the five bit base address 206 is the fourteen bit address of the head buffer 210.

Figure 14:
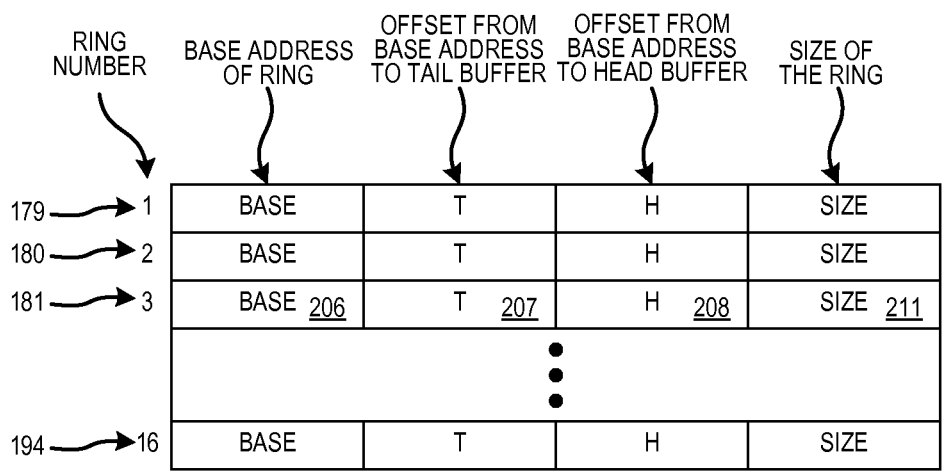
FIG. 14 is a simplified diagram of a set of ring descriptors associated with rings of buffers stored in the CLS of the ME island of FIG. 11.

FIG. 14 is a diagram of the sixteen ring descriptors 179-194 stored in the ring operation stage 173 of the pipeline. The third ring descriptor 181 corresponds to the ring 3 (the third ring) of FIG. 13. The base address value 206 of ring descriptor 181 indicates the starting address in memory unit 161 where the block of memory locations for ring 3 starts. The size value 211 stored in the ring descriptor 181 indicates the number of thirty-two bit buffers occupied by the ring. There is one such ring descriptor stored in ring operation stage 173 for each of the sixteen rings. The ring operation stage 173 handles maintaining the ring descriptors so that for each ring, the head pointer continues to point to the head buffer of the ring, and so that the tail pointer continues to point to the tail buffer of the ring.

Figure 15:
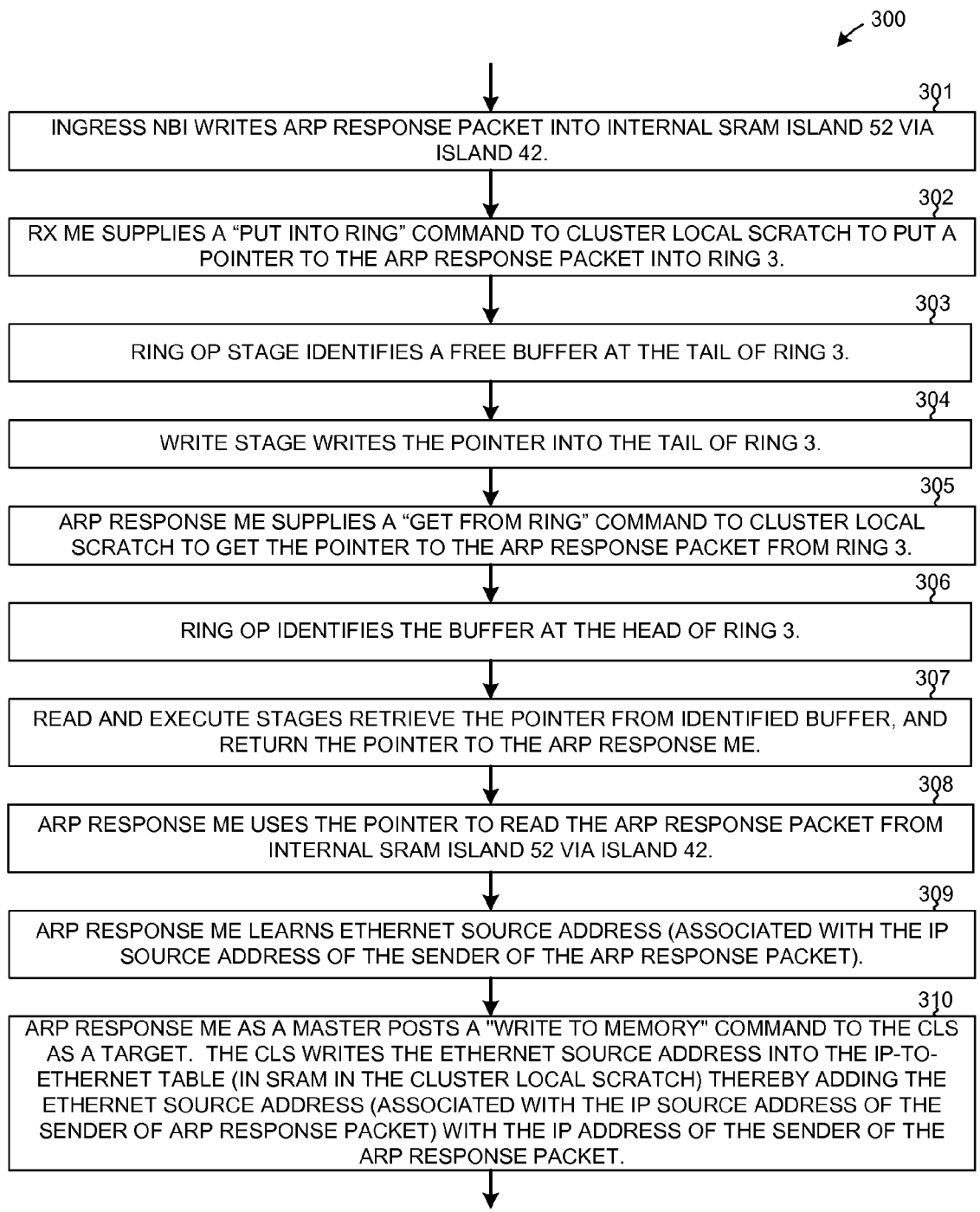
FIG. 15 is a flowchart of a method carried out by the microengines (MEs) illustrated in FIG. 10.
Figure 18:
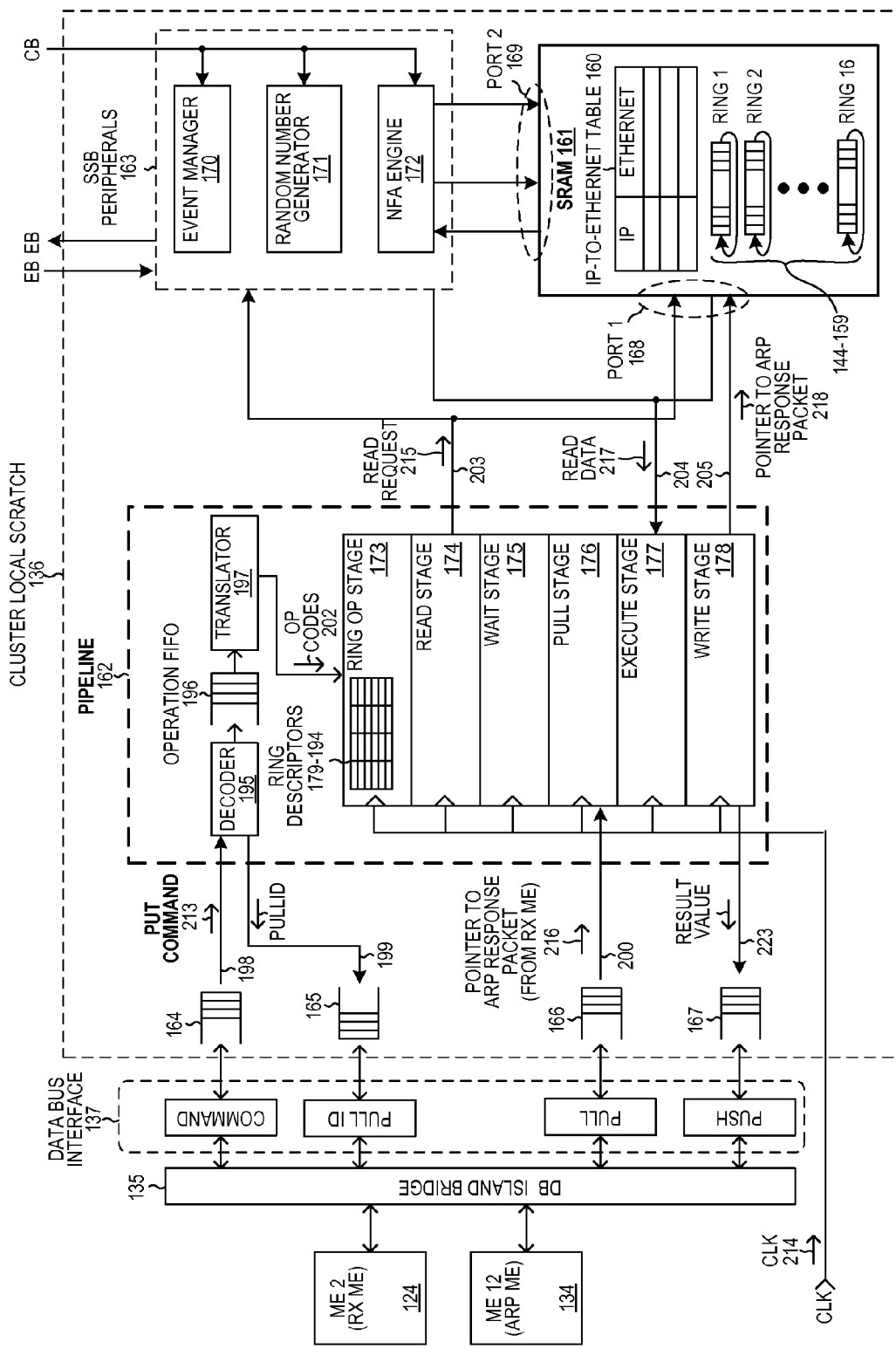
FIG. 18 is a diagram that illustrates operation of the CLS of FIG. 12 in the case of a "put into ring" command.

FIG. 15 is a flowchart of steps involves in the communication depicted in FIG. 10. In a first step (step 301) of the method 300, the ingress NBI island 46 writes both the first bytes of the ARP response packet (the header portion 141) as well as the ingress packet descriptor 212 for the ARP response packet (see FIG. 11) into CTM 138. The RX ME 124 analyzes the header portion and the ingress packet descriptor and determines that the packet is an exception packet that should be handled by the ARP response ME 134. The RX ME 124 therefore supplies a "put into ring" command 213 (step 302) to the CLS 136, where the ring indicated by command 213 is ring 3. The "put into ring" command 213 is a command to the CLS to put a thirty-two bit value into the tail buffer of an identified ring, if the ring is not already full, and to update the head and tail pointers of the ring so that the head pointer continues to point to the head buffer of the ring, and so that the tail pointer continues to point to the tail buffer of the ring. FIG. 16 is a diagram showing operations carried out by the ring operation stage when the pipeline executes a "put into ring" command. FIG. 18 is a diagram that shows the "put into ring" command 213 passing into pipeline 162. The "put into ring" command 213 passes through operation FIFO 196. Translator 197 converts the "put into ring" command into a set of opcodes 202. In a "put into ring" operation, there is data to be pulled so a pull-id is generated and pull data is received back into the pull stage 176. In the present example, the pull data is a pointer to the ARP response packet 216. In response to the opcode for the ring operation stage 173, the ring operation stage identifies (step 303) a free buffer at the tail of ring 3. The ring operation stage does this in one cycle of the signal CLK 214 by comparing the head pointer H 208 of ring 3 and the tail pointer T 207 of ring 3. The ring operation stage increments the sum of the tail pointer and the base address to find the address of the next available buffer, and outputs this address (the address in memory unit 161). The tail pointer 207 updated to reflect that the number of used buffers in ring 3 has now increased.

Memory unit 161 is actually organized as sixty-four bit words, so a word to be read from memory unit 161 is longer than an individual thirty-two bit buffer of the ring. A single memory location therefore stores more than just one buffer, and if an individual buffer is to be written then the prior value of the larger sixty-four bit memory location value must first be read, and then the part of the larger value replaced with the information to be written into the buffer, and then the entire larger sixty-four bit value written back into the memory unit. If the initial read were not done, then the prior contents of the memory location other than the new buffer to be written would be lost when the larger memory value is written back into the memory unit.

In the present example, the read stage 174 uses the address supplied by the ring operation stage to issue a read request 215 to read the sixty-four bit memory location in memory unit 161 that stores the tail buffer of ring 3. When the value 216 to be written into the ring is returned from the master as pull data via FIFO 166, the pull data 216 is supplied into pull stage 176. The execute stage 177 receives the larger memory location sixty-four bit value 217 read from memory unit 161 via conductors 204, and replaces the portion of that sixty-four bit value that is the tail buffer of ring 3 with the pull data 216 received via conductors 200. The write stage 178 then writes (step 304) the modified larger sixty-four bit value 218 back into memory unit 161. As a result, the value 216 that was pulled from the master is said to have been "put" into the tail of ring 3, and the tail pointer for ring 3 is incremented. In this way the RX ME 124 puts pointers to ARP response packet headers into ring 3.

Figure 19:
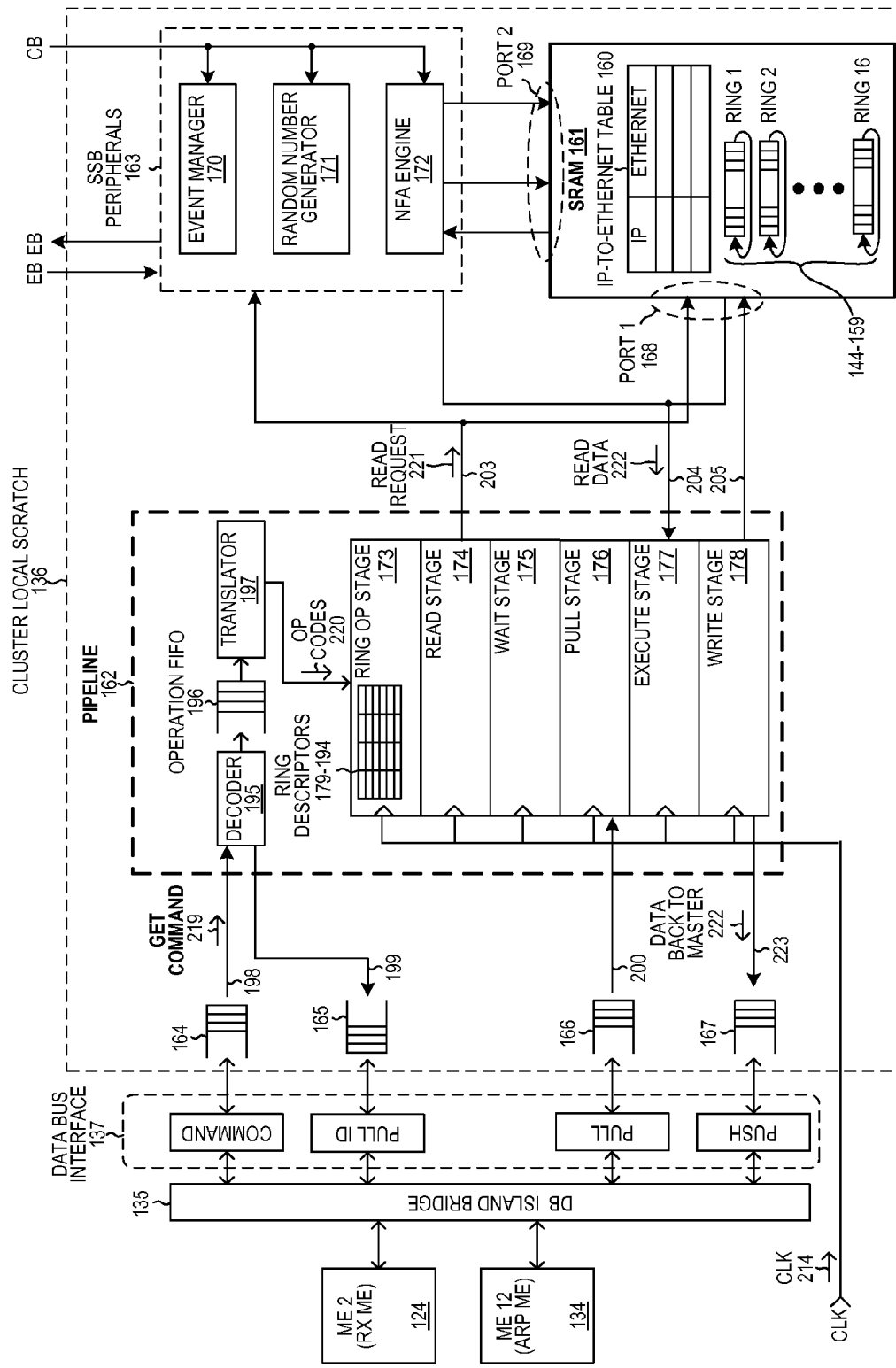
FIG. 19 is a diagram that illustrates operation of the CLS of FIG. 12 in the case of a "get from ring" command.

The ARP response ME 134 supplies a "get from ring" command 219 (step 305) to the CLS 136 via DB island bridge 135, where the indicated ring of the command is ring 3. FIG. 17 is a diagram showing the operations carried out when the pipeline executes a "get from ring" command. FIG. 19 is a diagram that shows the "get from ring" command 219 passing into pipeline 162. The command is converted into a set of opcodes 220 by translator 197. The ring operation stage 173 uses the head and tail pointers for ring 3 to determine if ring 3 is empty. If ring 3 is not empty, then the ring operation stage outputs an address of the head buffer of ring 3 (step 306), and updates the head pointer to reflect that the prior head buffer of the ring will thereafter be unused. The read stage 174 uses the address to generate a read request 221 to read the head buffer of ring 3, and this read request 221 is supplied to memory unit 161. In a "get from ring" operation, there is no data to be pulled so no pull-id is generated and no pull data is received back into the pull stage 176. The contents 222 of the head buffer of ring 3 is returned from memory unit 161 into the execute stage 177, and the write stage 178 outputs the contents 222 of the buffer to the master (step 307) via conductors 223 and FIFO 167. In the present example, RX ME 124 causes a pointer to be put into ring 3, where the pointer indicates where the header portion of the ARP response packet is stored in CTM 138. The ARP response ME 134 then causes the pointer to be retrieved from ring 3 by issuing the "get from ring" command 219 to the transactional memory.

Accordingly, the ARP response ME uses the pointer (step 308) to read the header portion of the ARP response packet from CTM 138. For this transaction, the ARP response ME 134 is the master and the CTM 138 is the target, even though both master and target are on the same island. From the header portion of the ARP response packet, the ARP response ME 134 learns (step 309) the ethernet source address that is associated with the IP source address of the sender of the ARP response packet. The ARP response ME 134 then issues a "write into memory" command 224 (step 310) to the CLS to write the ethernet source address into the IP-to-Ethernet table 160 in memory unit 161. For this transaction, the ARP response ME 134 is the master and the CLS 162 is the target, but both master and target are on the same island. As a result, after the method of FIG. 15 has been completed, there is an entry in the IP-to-Ethernet table 160 that indicates the ethernet source address of the sender of the ARP response packet.

Figure 20:
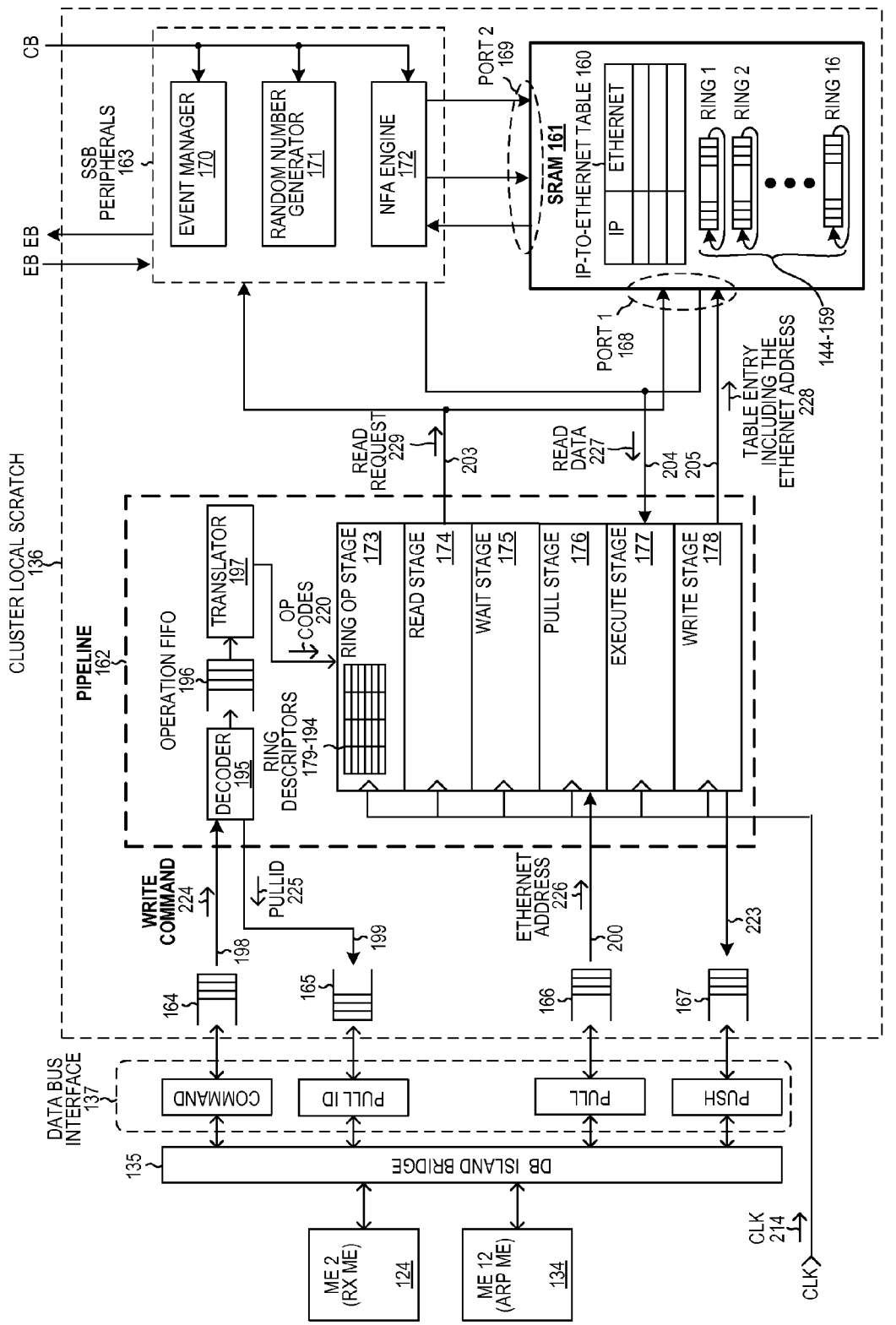
FIG. 20 is a diagram that illustrates operation of the CLS of FIG. 12 in the case of a write to memory command.

FIG. 20 is a diagram that illustrates how the "write into memory" command 224 causes an entry in the IP-to-Ethernet table 160 to be updated. A pull-id 225 is sent back to the master, and the ethernet address data 226 to be added to the table 160 is supplied by the master to the pipeline pull stage 176 by a pull operation. A read request 229 is issued to read the larger memory location where the corresponding table entry is stored. The larger overall value 227 is received, and only that part of the read value 227 is then overwritten with the ethernet address data 226, and then the overall revised memory location value 228 is written back into memory unit 161. As a result, the IP-to-Ethernet table 160 contains an entry for the IP source address that lists the corresponding ethernet source address.

Figure 21:
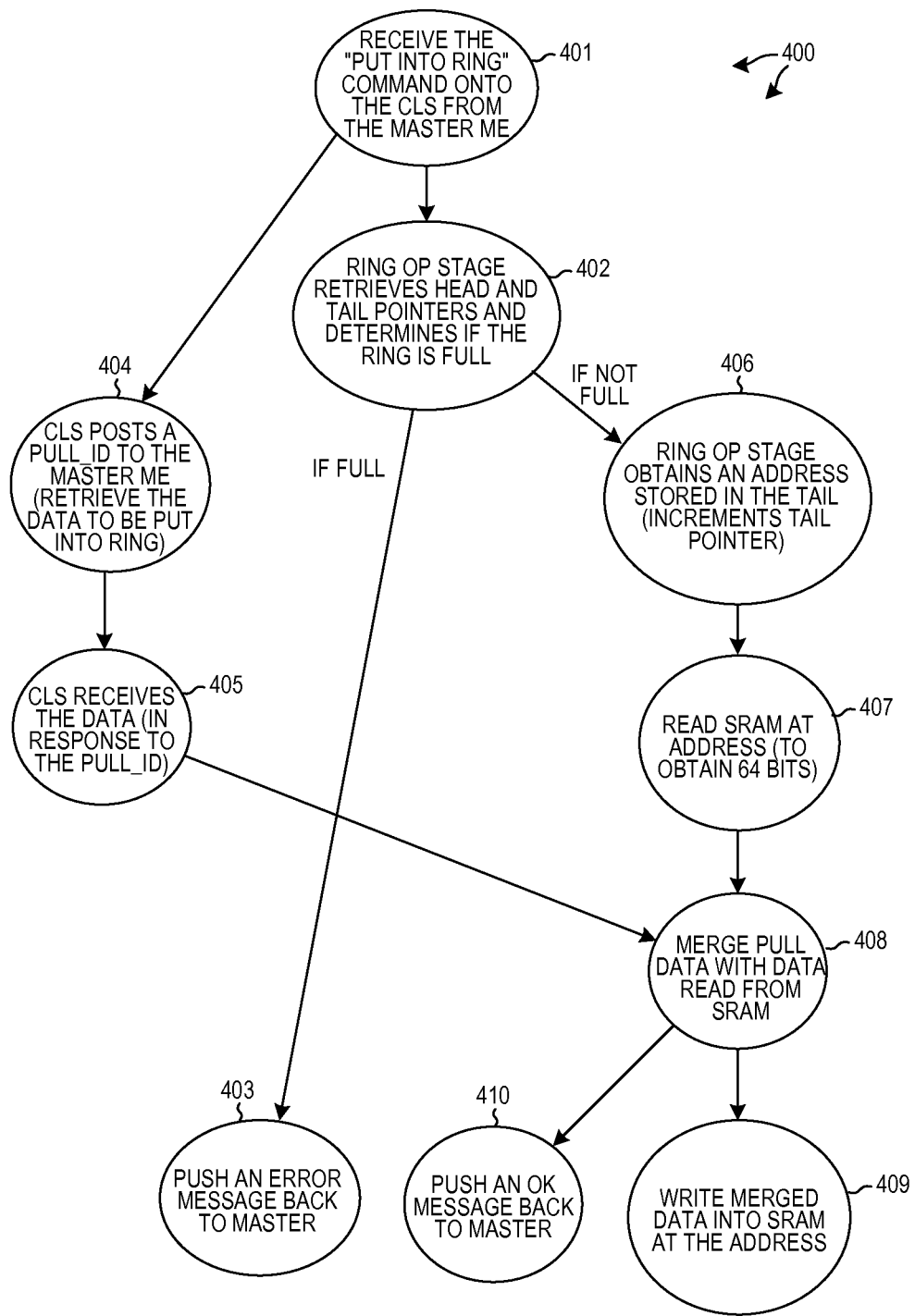
FIG. 21 is a flowchart of operations carried out when the CLS of FIG. 12 performs a "put into ring" command.

FIG. 21 is a diagram that illustrates a method 400 that is carried out when a "put into ring" command is executed. The "put into ring" command is received (step 401) onto the CLS from the master ME. In response to receiving the "put into ring" command, the pull-id is sent (step 404) to the master ME. The ring operation stage of the pipeline uses the head pointer and the tail pointer of the ring descriptor for the ring identified by the command to determine (step 402) if the identified ring is full. If the ring is full, then the stages 174-177 of the pipeline perform no operations, and the write stage 2178 outputs an error result message (step 403). The error message is pushed back (step 403) to the master ME via FIFO 167, data bus interface 137 and the data bus island bridge 135. The master ME uses the pull-id to send (step 405) the pull data to the CLS. The pull data is the data to be "put" into the ring. The ring operation stage uses the base address value and the tail pointer to determine (step 406) the address of the tail buffer. The ring operation stage also updates the tail pointer to reflect that the tail buffer is now the next buffer in the ring. The read stage uses the address from the ring operation stage to issue a read request (step 407) to the memory unit. The returned value (thirty-two bits) is merged (step 408) with the pull data (the value to be written into the tail buffer) so that the pull data overwrites the content of the tail buffer. The write stage then writes (step 409) the resulting merged data (sixty-four bits) back into the memory unit. The write stage also outputs an okay message (step 410) that is communicated back to the master ME via FIFO 167, data bus interface 137, and data bus island bridge 135.

Figure 22:
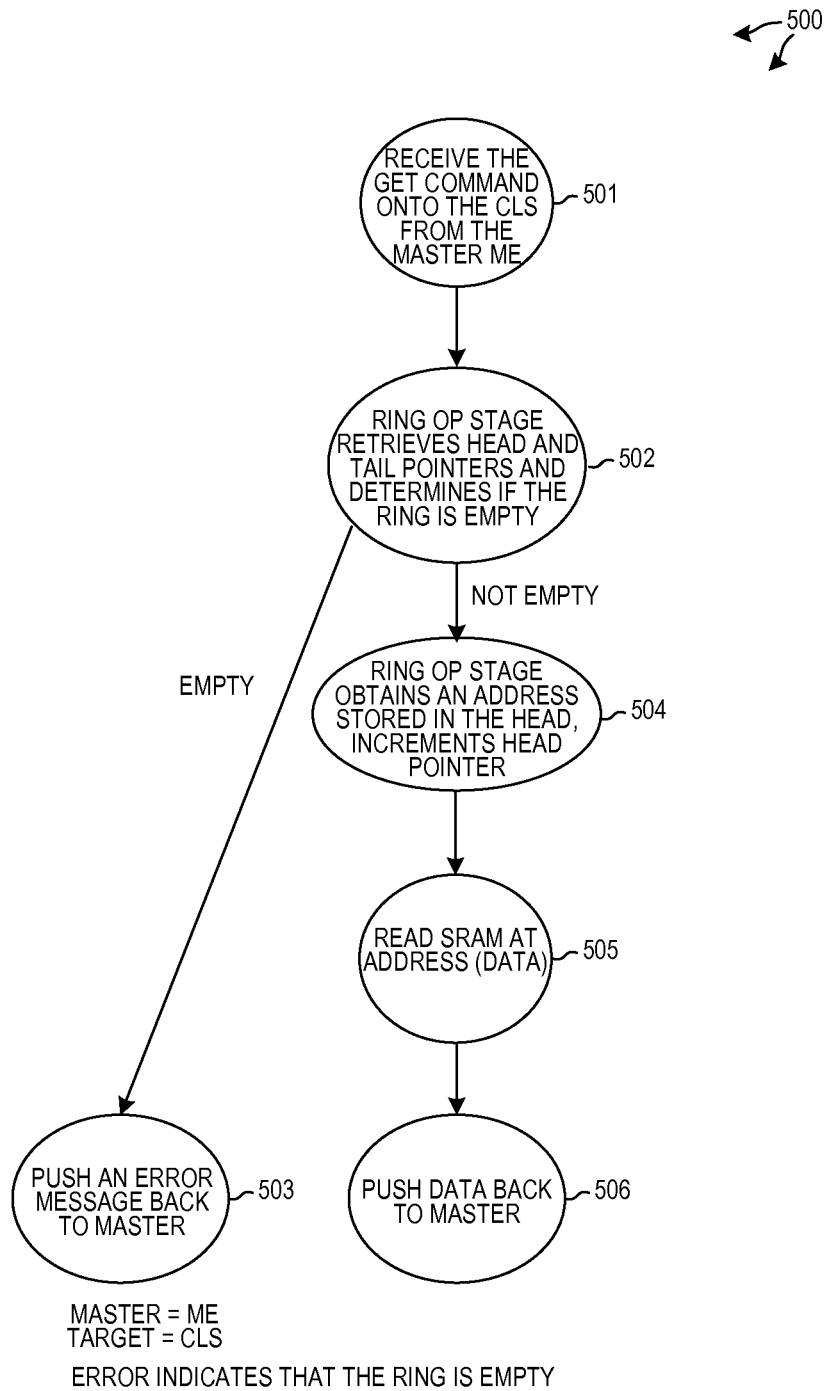
FIG. 22 is a flowchart of operations carried out when the CLS of FIG. 12 performs a "get from ring" command.

FIG. 22 is a diagram that illustrates a method 500 that is carried out when a "get from ring" command is executed. The "get from ring" command is received (step 501) onto the CLS from the master ME. The ring operation stage of the pipeline uses the head pointer and the tail pointer of the ring descriptor for the ring identified by the command to determine (step 502) if the identified ring is empty. If the ring is empty, then the stages 174-177 of the pipeline perform no operations, and the write stage 178 outputs an error result message (step 503). The error message is pushed back (step 503) to the master ME via FIFO 167, data bus interface 137 and the data bus island bridge 135. The ring operation stage also uses the base address value and the head pointer to determine the address of the head buffer. If the ring is determined to be not empty (step 502), then the ring operation stage outputs this address (step 504) to the read stage and increments the head pointer to reflect the fact that the head buffer will now be a different buffer. The read stage uses the address to issue a read request (step 505) to the memory unit to read the head buffer of the ring. The memory unit uses the address to read the head buffer, and returns the data to the execution stage. The write stage then pushes (step 506) the data back to the master via FIFO 167, data bus interface 137 and the data bus island bridge 135.

Figure 23:
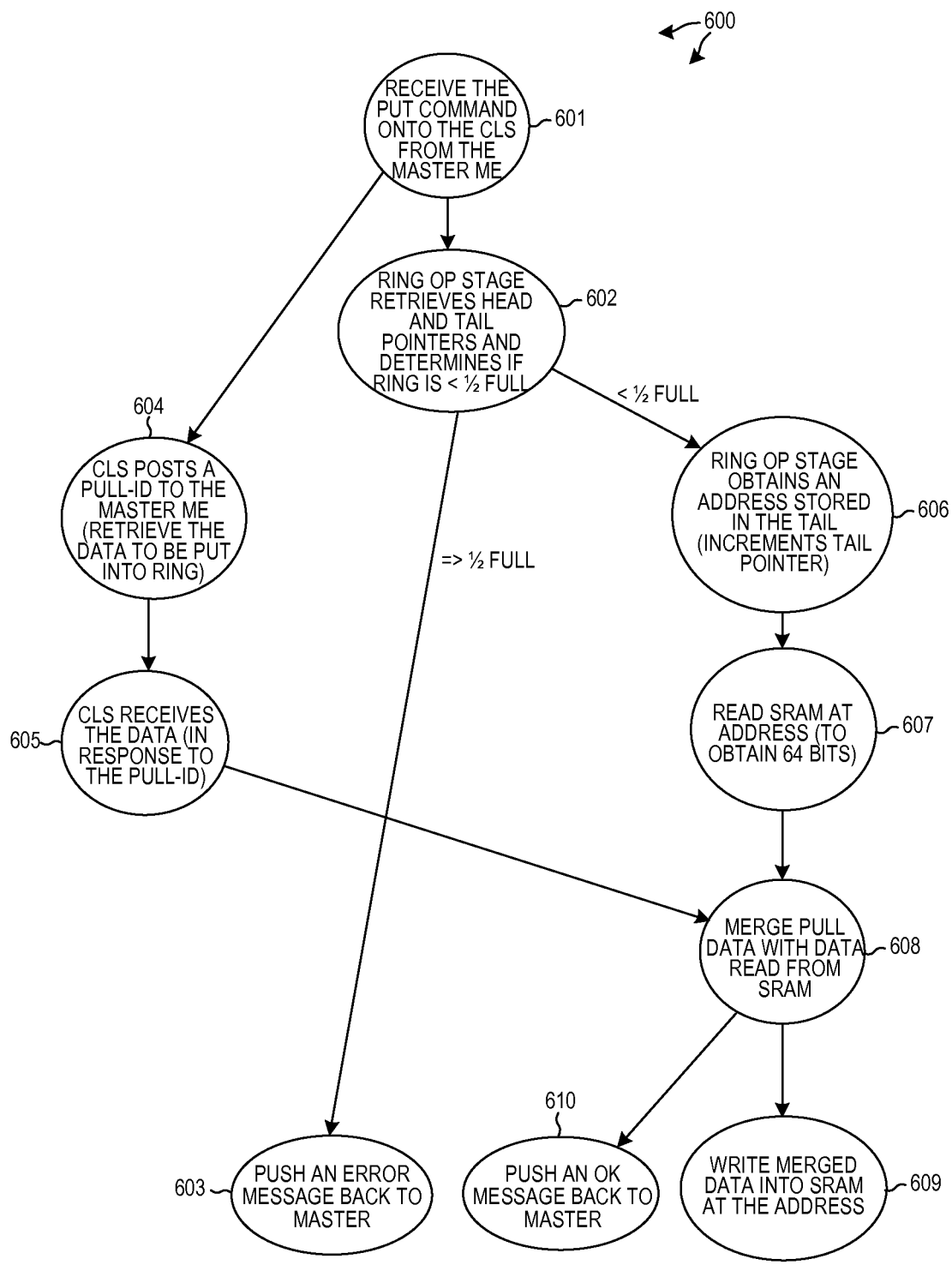
FIG. 23 is a flowchart of operations carried out when the CLS of FIG. 12 performs a "put into ring with low priority" command.

FIG. 23 is a diagram that illustrates a method 600 that is carried out when a "put into ring with low priority" command is executed. The "put into ring with low priority" command is received (step 601) onto the CLS from the master ME. In response to receiving the "put into ring with low priority" command, the CLS posts a pull-id (step 604) to the master ME to retrieve the data to be put into the ring. The ring operation stage of the pipeline uses the head pointer and the tail pointer of the ring descriptor for the ring identified by the command to determine (step 602) if the identified ring is less than half full. If the ring is determined (step 602) not to be less than half full, then the stages 174-177 of the pipeline perform no operations, and the write stage 178 outputs an error result message (step 603). The error message is pushed back to the master ME via FIFO 167, data bus interface 137 and the data bus island bridge 135. The master ME returns the data back (step 605) to the pull stage of the CLS. The ring operation stage uses the tail pointer and the base address to determine (step 606) the address of the tail pointer in the memory unit. The ring operation stage also updates the tail pointer to reflect the fact that the tail buffer will now be a different buffer. The read stage uses the address determined by the ring operation stage to issue a read request (step 607) to the memory unit to read the memory location that stores the tail buffer. The memory unit returns the data to the execute stage, and the execute stage merges (step 608) the data read with the pull data to generate merged data. The write stage writes the merged data (step 609) back into the memory unit at the address of the tail buffer. The write stage also pushes an okay message (step 610) back to the master ME.

Figure 24:
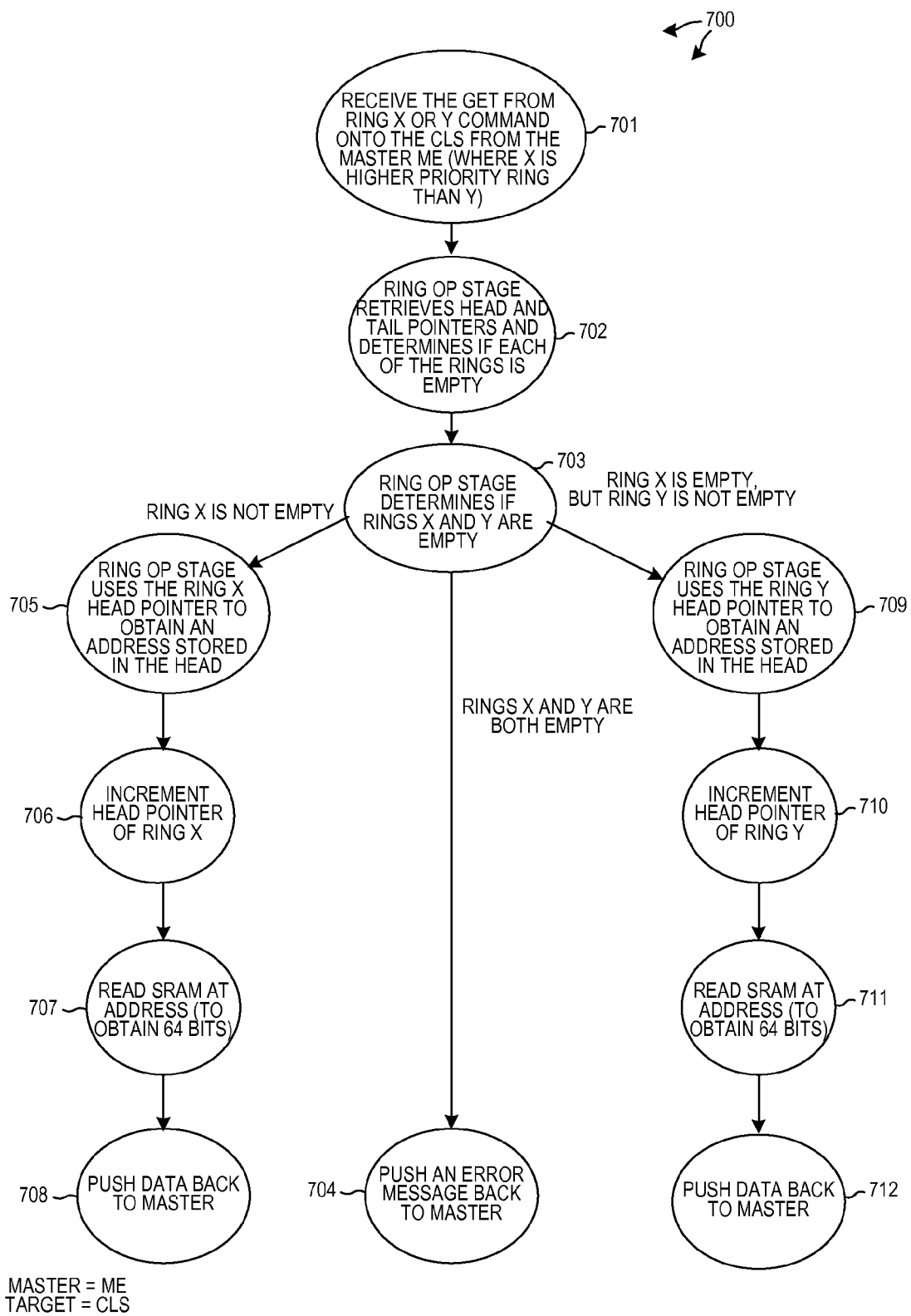
FIG. 24 is a flowchart of operations carried out when the CLS of FIG. 12 performs a "get from a set of rings" command.

FIG. 24 is a diagram that illustrates a method 700 that is carried out when a "get from a set of rings" command is executed. The "get from a set of rings" command is received (step 701) onto the CLS from the master ME. In this specific example, the command indicates that there are only two rings in the set, so the command is referred to in FIG. 26 as a "get from ring X or Y" command. The ring operation stage uses the head and tail pointers of each ring of the set to determine whether the ring is empty (step 702). In the present example, the ring operation stage determines whether ring X is empty, and whether ring Y is empty. If the ring operation stage determines (step 703) that both rings X and Y are empty, then the stages 174-177 of the pipeline perform no operations, and the write stage 178 outputs an error result message (step 704). The error message is pushed back to the master ME via FIFO 167, data bus interface 137 and the data bus island bridge 135. If ring X is not empty, then the ring operation stage uses the head pointer and the base address for ring X to determine (step 705) the address of the head buffer in the memory unit. The ring operation stage increments the head pointer for ring X to reflect that there is now a new head buffer for ring X. The read stage uses the address (step 707) to issue a read request to read the head buffer from the memory unit. The memory unit returns the data to the execute stage, and the write stage pushes (step 708) the data (the data is the value read from the head buffer of ring X) back to the master ME. If the ring operation stage determines that ring X is empty but ring Y is not empty, then the ring operation stage uses the base address and the head pointer for ring Y to determine (step 709) the address in the memory unit where the head buffer of ring Y is stored. The ring operation stage also increments the head pointer (step 710) for ring Y to reflect that there is now a new head buffer for ring Y. The read stage uses the address to issue a read request (step 711) to read the head buffer from the memory unit. The memory unit returns the data to the execute stage, and the write stage pushes (step 712) the data (the data is the value read from the head buffer of ring Y) back to the master ME.

Figure 25:
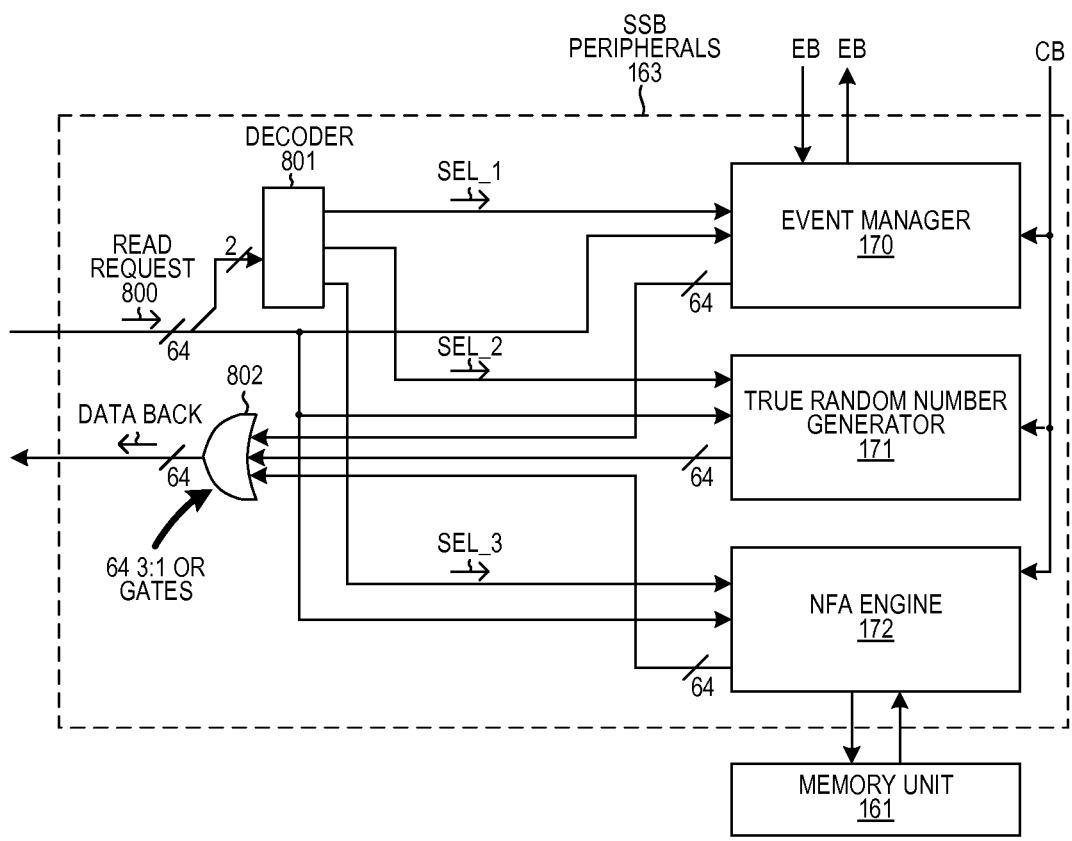
FIG. 25 is a block diagram of the SSB peripheral block of the CLS of FIG. 12.

FIG. 25 is a simplified diagram of the SSB peripherals block 163 of CLS 136. Several bits of an incoming read request 800 are decoded by decoder 801 to identify either the event manager 170, or the true random number generator 171, or the NFA engine 172. There are three select signals SEL_1, SEL_2 and SEL_3, only one of which can be asserted. If one of the blocks 170, 171 and 172 does not receive an asserted select signal, then that block outputs sixty-four digital low bit values on its sixty-four output lines back to OR structure 802. The selected block, however, can output a sixty-four bit value on its sixty-four output lines back to the OR structure 802. The sixty-four bit value output by the selected block therefore passes through the OR structure 802 and back to the execute stage 177 in the form of read data. In a similar way, the selected block can be made to outputs its sixty-four bit output value to port 2 of the memory unit 161.

Figure 26:
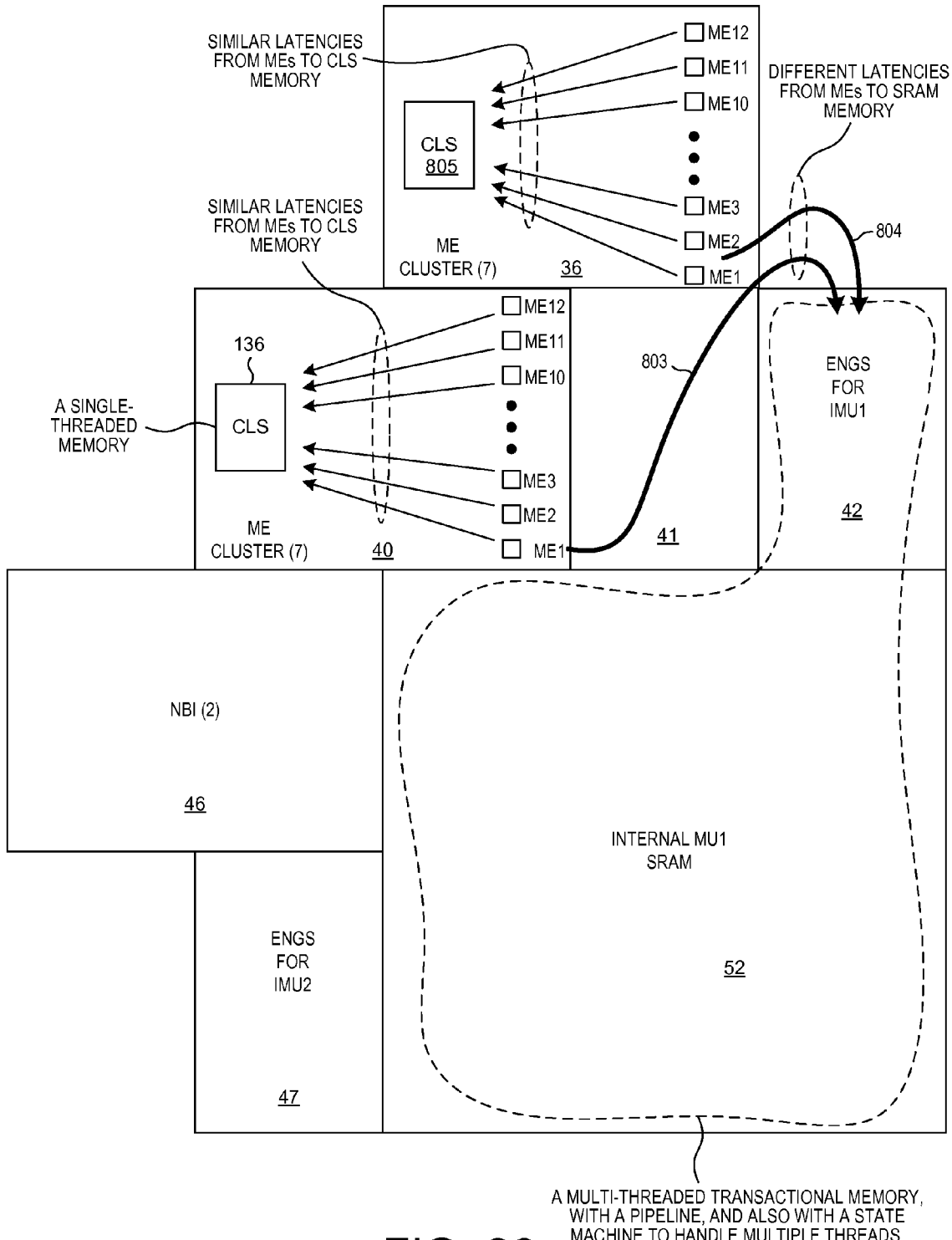
FIG. 26 is a diagram that shows another novel aspect involving a single-threaded transactional memory (the CLS of FIG. 12) and a multi-threaded transactional memory (the transactional memory of the MU island).

FIG. 26 is a diagram that illustrates another novel aspect. Islands 42 and 52 together are a transactional memory, but this memory is a multi-threaded transactional memory because there are different latencies from the masters that might be causing the memory to perform tasks to the memory itself. For example, the access latency from ME1 of ME island 40 through the CPP bus to the transactional memory of islands 42 and 52 is longer than is the access latency from ME1 of ME island 36 to the transactional memory. Arrows 803 and 804 represent these difference access latencies. The pipeline of the multi-threaded memory therefore has an associated state machine that holds off sending commands through the pipeline until the necessary data to be used by the pipeline has been retrieved. The pipeline of the multi-threaded transactional memory is therefore relatively complex. In one novel aspect, the transactional memories 136 and 805 of the ME islands 40 and 36 are relatively simple single-threaded transactional memories. Access latencies from the microengines of an ME island to the CLS of the same ME island are substantially the same.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A transactional memory, comprising:
   a memory unit that stores a ring of buffers, wherein one of the buffers is a tail buffer; and
   a ring buffer control circuit that receives a put into ring command, wherein the ring buffer control circuit does not have an instruction counter that it uses to fetch instructions from any memory, wherein the ring buffer control circuit comprises:
   a memory access portion coupled to read from and write to the memory unit; and
   a ring operation portion, wherein the ring operation portion: 1) stores and maintains a tail pointer so that the tail pointer points to the tail buffer of the ring, 2) in response to the receiving of the put into ring command uses the tail pointer to determine an address, and 3) supplies the address to the memory access portion such that the memory access portion uses the address to write to the tail buffer of the ring.

2. The transactional memory of claim 1, wherein the ring operation portion initiates a write to the tail buffer and then adjusts the tail pointer.

3. The transactional memory of claim 1, wherein the ring operation portion adjusts the tail pointer and then initiates a write to the tail buffer.

4. The transactional memory of claim 1, wherein the ring operation portion determines if the ring is not full and only if the ring is not full does the memory access portion perform the write to the tail buffer.

5. The transactional memory of claim 1, wherein the transactional memory receives the put into ring command via a bus, wherein the ring operation portion determines if the ring is full and if the ring is full then the memory access portion does not perform the write to the tail buffer but rather the memory access portion outputs an error message that is communicated from the transactional memory to the bus.

6. The transactional memory of claim 1, wherein the ring operation portion also stores and maintains a head pointer so that the head pointer points to the head buffer of the ring, and wherein the ring operation portion uses the head pointer and the tail pointer to determine if the ring of buffers is full.

7. The transactional memory of claim 1, wherein the ring operation portion also stores a count of entries value, and wherein the ring operation portion compares the count of entries value with a preset value to determine if the ring of buffers if full.

8. The transactional memory of claim 1, wherein the transactional memory receives the put into ring command from a bus via a bus interface.

9. The transactional memory of claim 1, wherein the ring buffer control circuit is a pipeline, wherein the ring operation portion is a stage of the pipeline, and wherein the memory access portion comprises a plurality of other stages of the pipeline.

10. The transactional memory of claim 9, wherein the pipeline is clocked by a clock signal, and wherein the ring operation portion can process a different command each cycle of the clock signal.

11. The transactional memory of claim 1, wherein the ring buffer control circuit is a pipeline that receives a value onto the transactional memory from a bus, and wherein if the ring is not full then the memory access portion writes the value into the tail buffer of the ring as a part of executing the put into ring command.

12. The transactional memory of claim 1, wherein the ring buffer control circuit comprises a pipeline, wherein the ring operation portion is a stage of the pipeline, wherein the memory access portion comprises a plurality of other stages of the pipeline, wherein multiple commands can be simultaneously processed in the pipeline at a given time, and wherein one of the multiple commands can be a put into ring command.

13. The transactional memory of claim 12, wherein one of the multiple commands is a get from ring command that causes: 1) the ring operation portion to use a head pointer to determine an address, 2) the address to be supplied to the memory access portion such that the memory access portion uses the address to read a value from a head buffer of the ring, 3) the ring operation portion to adjust the head pointer, and 4) the value that was read from the head buffer to be output from the transactional memory.

14. The transactional memory of claim 1, wherein the ring operation portion maintains and stores a ring descriptor for the ring, wherein the tail pointer is stored as part of the ring descriptor, and wherein the ring descriptor further comprises a head pointer and a base address value.

15. The transactional memory of claim 14, wherein the ring descriptor further comprises a ring size value.

16. The transactional memory of claim 1, wherein the ring buffer control circuit further comprises a first-in-first-out (FIFO) memory, wherein commands are received from a bus and pass into the FIFO, and wherein the put into ring command is one of the commands received from the bus.

17. A transactional memory, comprising:
    a memory unit that stores a ring of buffers, wherein one of the buffers is a tail buffer and wherein another of the buffers is a head buffer; and
    a ring buffer control circuit adapted to receive a ring command, wherein the ring buffer control circuit does not have an instruction counter that it uses to fetch instructions from any memory, wherein the ring buffer control circuit comprises:
        a memory access portion coupled to read from and write to the memory unit; and
        a ring operation portion, wherein the ring operation portion maintains a tail pointer and a head pointer, wherein the ring operations buffer in response to the receiving of the ring command causes the memory access portion to access a buffer of the ring and to adjust either the tail pointer or the head pointer.

18. The transactional memory of claim 17, wherein the ring command is a put into ring command, wherein the accessing of the buffer involves writing a value to the buffer, and wherein the adjusting is an adjusting of the tail pointer.

19. The transactional memory of claim 17, wherein the ring command is a get from ring command, wherein the accessing of the buffer involves reading of a value from the buffer, and wherein the adjusting is an adjusting of the head pointer.

20. A method comprising:
    (a) storing a ring of buffers in a memory unit of a transactional memory, wherein the ring of buffers includes a head buffer and a tail buffer;
    (b) maintaining a tail pointer and a head pointer in a first stage of a pipeline of the transactional memory;
    (c) receiving a put into ring command from a bus and onto the transactional memory;
    (d) in the first stage of the pipeline using the head pointer and the tail pointer to determine if the ring is full; and
    (e) if the ring is determined to be not full in (d) then using the tail pointer to write a value into the tail buffer, wherein the writing of the value is performed by a stage of the pipeline other than the first stage, wherein the pipeline is clocked by a clock signal, and wherein the first stage processes a different command each cycle of the clock signal.

21. The method of claim 20, further comprising:
    (f) if the ring is determined to be full in (d) then outputting an error message from the transactional memory onto the bus, wherein the outputting of the error message is performed by a stage of the pipeline other than the first stage.

22. The method of claim 20, wherein no stage of the pipeline has an instruction counter, and wherein no stage of the pipeline fetches, decodes and executes instructions.

\* \* \* \* \*